US012368966B2

(12) United States Patent
Maekelae et al.

(10) Patent No.: US 12,368,966 B2
(45) Date of Patent: Jul. 22, 2025

(54) SYSTEMS AND METHODS FOR FACILITATING DARK CURRENT COMPENSATION BY WEIGHTED FILTERING

(71) Applicant: Microsoft Technology Licensing, LLC, Redmond, WA (US)

(72) Inventors: Christian Markus Maekelae, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 18/306,727

(22) Filed: Apr. 25, 2023

(65) Prior Publication Data

US 2024/0365012 A1    Oct. 31, 2024

(51) Int. Cl.
*H04N 23/81* (2023.01)
*H04N 23/76* (2023.01)
*H04N 25/63* (2023.01)

(52) U.S. Cl.
CPC ............. *H04N 23/81* (2023.01); *H04N 23/76* (2023.01); *H04N 25/63* (2023.01)

(58) Field of Classification Search
CPC ........ H04N 23/81; H04N 23/76; H04N 25/63; H04N 25/60; H04N 23/682; H04N 23/683; H04N 23/6845; G06T 5/92; G06T 5/50
USPC .............. 348/243, 241, 208.4, 208.6, 208.12
See application file for complete search history.

(56) References Cited

U.S. PATENT DOCUMENTS

| | | | |
|---|---|---|---|
| 6,366,317 B1* | 4/2002 | Mattison | H04N 5/145 348/241 |
| 6,714,241 B2* | 3/2004 | Baer | H04N 25/671 348/241 |
| 10,404,930 B2 | 9/2019 | Shin | |
| 2005/0195296 A1* | 9/2005 | Compton | H04N 25/671 348/241 |
| 2006/0256215 A1* | 11/2006 | Zhang | H04N 25/63 348/E5.081 |
| 2012/0091340 A1 | 4/2012 | Young | |

(Continued)

FOREIGN PATENT DOCUMENTS

CN    102663714 A    9/2012

OTHER PUBLICATIONS

Invitation to Pay Additional Fees Received in PCT Application No. PCT/US2024/032293, mailed on Oct. 18, 2024, 14 pages.

(Continued)

*Primary Examiner* — Albert H Cutler
(74) *Attorney, Agent, or Firm* — Workman Nydegger

(57) ABSTRACT

A system for facilitating dark current compensation by weighted filtering is configurable to (i) receive an input dark current image; (ii) generate a corrected dark current image at least by scaling pixel values of the input dark current image based upon ambient light conditions; and generate a weight map comprising a weight value for each pixel of the corrected dark current image. For each pixel of the corrected dark current image, the weight value of the weight map may be based upon a light level of the pixel of the corrected dark current image. The system is also configurable to generate an output image by utilizing the weight map to filter an input image.

20 Claims, 17 Drawing Sheets

(56) References Cited

U.S. PATENT DOCUMENTS

| | | | | |
|---|---|---|---|---|
| 2013/0242121 A1* | 9/2013 | Kashiwagi | ............ | H04N 25/67 |
| | | | | 348/208.4 |
| 2015/0036009 A1* | 2/2015 | Takizawa | ........... | H04N 23/6842 |
| | | | | 348/208.6 |
| 2018/0027199 A1 | 1/2018 | Okubo | | |
| 2019/0280037 A1* | 9/2019 | Kanto | .................... | H04N 25/63 |
| 2023/0117006 A1 | 4/2023 | Price | | |
| 2024/0323557 A1 | 9/2024 | Zhu | | |
| 2024/0362749 A1 | 10/2024 | Maekelae | | |
| 2024/0365018 A1 | 10/2024 | Maekelae | | |

OTHER PUBLICATIONS

International Search Report and Written Opinion received for PCT Application No. PCT/US2024/032293, mailed on Dec. 9, 2024, 16 pages.

International Search Report and Written Opinion received for PCT Application No. PCT/US2024/032568, Jan. 8, 2025, 16 pages.

Choi et al.: "Multi-spectral Flash Imaging under Low-light Condition using Optimization with Weight Map :", Proceedings of the 9th International Conference on Computer Vision Theory and Applications, Jan. 1, 2014, pp. 33-39, Retrieved from the Internet: URL:https://www.scitepress.org/Papers/2014/46575/46575.pdf.

Invitation to Pay Additional Search Fee Received in PCT Application No. PCT/US2024/032568, mailed on Nov. 5, 2024, 14 pages.

Non-Final Office Action mailed on Dec. 16, 2024, in U.S. Appl. No. 18/306,730, 13 pages.

Invitation to Pay Additional Fees Received in PCT Application No. PCT/US2024/032618, mailed 1 on Feb. 5, 2025, 13 pages.

U.S. Appl. No. 18/306,693, filed Apr. 25, 2023.

U.S. Appl. No. 18/306,730, filed Apr. 25, 2023.

International Search Report and Written Opinion received for PCT Application No. PCT/US2024/032618, Mar. 26, 2025, 15 pages.

Notice of Allowance mailed on Apr. 2, 2025, in U.S. Appl. No. 18/306,730, 5 pages.

* cited by examiner

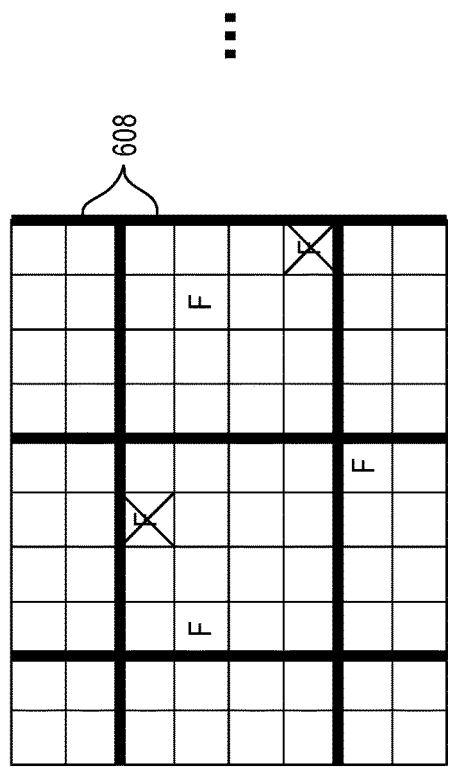
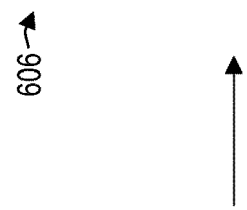
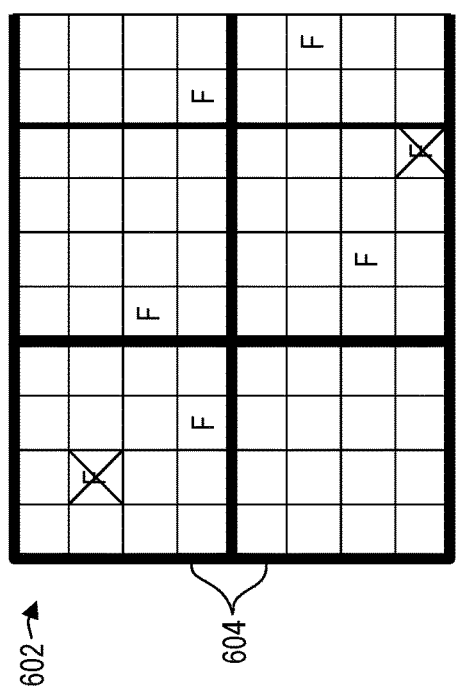
FIG. 6

SYSTEMS AND METHODS FOR FACILITATING DARK CURRENT COMPENSATION BY WEIGHTED FILTERING

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras for facilitating image capture, video capture, and/or other functions. For instance, cameras of an MR system may utilize images and/or depth information obtained using the camera(s) to provide pass-through views of a user's environment to the user. An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time-of-flight camera, a rangefinder, stereoscopic depth cameras, etc.). In some instances, an MR system utilizes one or more predefined depth values to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected pass-through" views/images. By way of illustration, parallax-corrected pass-through images may appear to a user as though they were captured by cameras that are co-located with the user's eyes.

A pass-through view can aid users in avoiding disorientation and/or safety hazards when transitioning into and/or navigating within a mixed-reality environment. Pass-through views may also enhance user views in low visibility environments. For example, mixed-reality systems configured with long wavelength thermal imaging cameras may facilitate visibility in smoke, haze, fog, and/or dust. Likewise, mixed-reality systems configured with low light imaging cameras facilitate visibility in dark environments where the ambient light level is below the level required for human vision.

To facilitate imaging of an environment for generating a pass-through view, some MR systems include image sensors that utilize complementary metal-oxide-semiconductor (CMOS) and/or charge-coupled device (CCD) technology. For example, such technologies may include image sensing pixel arrays where each pixel is configured to generate electron-hole pairs in response to detected photons. The electrons may become stored in per-pixel capacitors, and the charge stored in the capacitors may be read out to provide image data (e.g., by converting the stored charge to a voltage).

However, such image sensors suffer from a number of shortcomings. For example, the signal to noise ratio for a conventional image sensor may be highly affected by read noise, especially when imaging under low visibility conditions. For instance, under low light imaging conditions (e.g., where ambient light is below about 10 lux, such as within a range of about 1 millilux or below), imaging sensors may detect only a small number of photons, which may cause the read noise and/or fixed pattern noise to approach or exceed the signal detected by the imaging pixel and decrease the signal-to-noise ratio.

The dominance of read noise and/or fixed pattern noise in a signal detected by a CMOS or CCD image sensor is often exacerbated when imaging at a high frame rate under low light conditions. Although a lower framerate may be used to allow a CMOS or CCD sensor to detect enough photons to allow the signal to avoid being dominated by read noise, utilizing a low framerate often leads to motion blur in captured images. Motion blur is especially problematic when imaging is performed on an HMD or other device that undergoes regular motion during use.

In addition to affecting pass-through imaging, the read noise and/or motion blur associated with conventional image sensors may also affect other operations performed by HMDs, such as late stage reprojection, rolling shutter corrections, object tracking (e.g., hand tracking), surface reconstruction, semantic labeling, 3D reconstruction of objects, and/or others.

To address shortcomings associated with CMOS and/or CCD image sensors, devices have emerged that utilize single photon avalanche diode (SPAD) image sensors. A SPAD pixel is operated at a bias voltage that enables the SPAD to detect a single photon. Upon detecting a single photon, an electron-hole pair is formed, and the electron is accelerated across a high electric field, causing avalanche multiplication (e.g., generating additional electron-hole pairs). Thus, each detected photon may trigger an avalanche event. A SPAD may operate in a gated manner (each gate corresponding to a separate shutter operation), where each gated shutter operation may be configured to result in a binary output. The binary output may comprise a "1" where an avalanche event was detected during an exposure (e.g., where a photon was detected), or a "0" where no avalanche event was detected.

Separate shutter operations may be performed consecutively and integrated over a frame capture time period. The binary output of the consecutive shutter operations over a frame capture time period may be counted, and an intensity value may be calculated based on the counted binary output.

An array of SPADs may form an image sensor, with each SPAD forming a separate pixel in the SPAD array. To capture an image of an environment, each SPAD pixel may detect avalanche events and provide binary output for consecutive shutter operations in the manner described herein.

The per-pixel binary output of consecutive shutter operations over a frame capture time period may be counted, and per-pixel intensity values may be calculated based on the counted per-pixel binary output. The per-pixel intensity values may be used to form an intensity image of an environment.

Although SPAD sensors show promise for overcoming various shortcomings associated with CMOS or CCD sensors, implementing SPAD sensors for image and/or video capture is still associated with many challenges. For example, there is an ongoing need and desire for improvements to the image quality of SPAD imagery, particularly for SPAD imagery captured under low light conditions.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which:

FIGS. 6 and 7 illustrate conceptual representations of performing non-maximum suppression pursuant to generating a dark current residual image.

DETAILED DESCRIPTION

Figure 1:
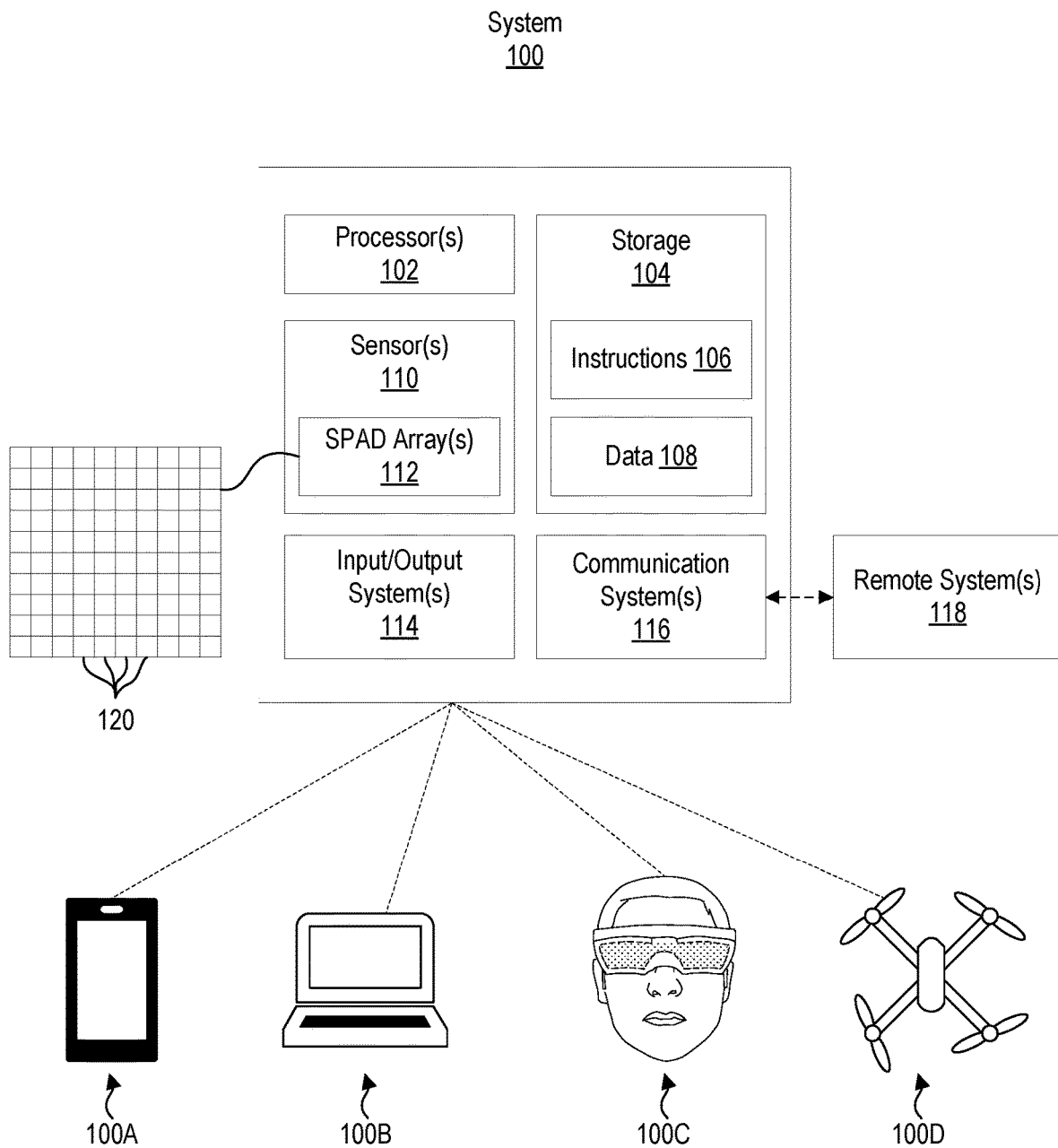
FIG. 1 illustrates example components of an example system that may include or be used to implement one or more disclosed embodiments.

Disclosed embodiments are generally directed to systems, methods, and apparatuses for compensating for the effects of dark current in captured imagery.

Examples of Technical Benefits, Improvements, and Practical Applications

Those skilled in the art will recognize, in view of the present disclosure, that at least some of the disclosed embodiments may be implemented to address various shortcomings associated with at least some conventional imaging systems, particularly for imaging under low light conditions. The following section outlines some example improvements and/or practical applications provided by the disclosed embodiments. It will be appreciated, however, that the following are examples only and that the embodiments described herein are in no way limited to the example improvements discussed herein.

As noted above, there is an ongoing need and desire for improvements to the image quality of SPAD imagery, particularly for SPAD imagery captured under low light conditions. For example, a challenge associated with image acquisition using SPADs is signal noise brought about by dark current. Dark current (sometimes referred to as reverse bias leakage current) refers to a small electric current that flows through photosensitive devices (e.g., SPADs) even when no photons are entering the device. Dark current can be thermally induced or brought about by crystallographic and/or manufacturing irregularities and/or defects.

In SPADs, dark current can cause an electron-hole pair to be generated in the depletion region and can trigger avalanche events, even when the SPAD is not detecting a photon. Avalanche events brought about by dark current are typically counted as detected photons, which can cause the binary output of a SPAD to include false counts (or "dark counts"). In SPAD imagery, dark counts can cause the intensity values assigned to at least some SPAD pixels to be inaccurately high, which can add noise to SPAD imagery. In some instances, the effects of dark counts are prominent when imaging under low light conditions, contributing to high fixed pattern noise that degrades user experiences. These pixels or groups of pixels, also known as hot clusters, are regions with higher dark current (also referred to as "dark counts") than adjacent pixels.

Sensor pixels that have a tendency to generate dark counts are referred to herein as "faulty" pixels, whereas pixels that do not have such a tendency are referred to herein as "non-faulty" pixels.

One technique for compensating for dark current in SPAD imagery includes obtaining a dark current image that indicates the locations of faulty pixels and/or the quantity of dark counts generated by the faulty pixels. In some instances, dark current images can be captured during device calibration by covering the SPAD sensor and performing image capture operations. The dark current image can then be used at runtime to modify images captured using the SPAD array to compensate for dark counts, such as by performing a subtraction operation that subtracts the dark current image from the captured SPAD imagery.

However, SPAD sensors can degrade and/or otherwise change overtime. For instance, the amount of dark current generated by faulty pixels can change (increase or decrease) over time. Furthermore, after factory calibration to determine the locations of faulty pixels, additional image sensing pixels of a SPAD sensor may become newly faulty. Still furthermore, after factory calibration, previously faulty pixels may become non-faulty. Such changes in the faulty or non-faulty status of image sensing pixels of a SPAD sensor can occur frequently throughout the course of a single user experience. Thus, subtraction of factory calibrated dark current imagery from runtime imagery can fail to compensate for dark current noise in a manner that accounts for the changes in the faulty and non-faulty statuses of SPAD pixels.

At least some disclosed embodiments are directed to generating dark current residual images that depict dark current states for pixels of image sensors in runtime implementations. A dark current residual image may indicate per-pixel dark current states such as faulty, non-faulty, newly faulty, newly non-faulty, no change, and/or others. Although some examples provided herein discuss dark current states in a discrete manner, other indications of dark current states are within the scope of the present disclosure. For instance, dark current states may be representable in a continuous manner, enabling representation of different magnitudes of pixel faultiness and/or representation of the effects of a faulty or non-faulty pixel on its neighboring pixels (with positive values indicating newly faulty pixels and with negative values indicating newly non-faulty pixels).

The dark current residual image may be obtained via a template matching process performed on a (weighted) average image (e.g., a running weighted average of input images). Further operations may be applied to obtain the dark current residual dark current image, such as non-maximum suppression (e.g., to advantageously mitigate erroneous faulty pixel nor newly non-faulty pixel detections) and/or cross-talk template fitting (e.g., to advantageously cause the residual dark current image to model cross-talk between a faulty pixel and its neighboring pixels).

A dark current residual image may be applied to a reference dark current image (e.g., a modified factory calibrated dark current image) to obtain a refined dark current image. By modifying a reference dark current image with a dark current residual image, the refined dark current image may represent changes to dark current statuses of pixels of an image sensor relative to the reference dark current image, thereby providing an improved basis to perform dark current compensation in runtime imagery.

In some instances, a dark current residual image obtained according to disclosed techniques may itself be utilized as a refined dark current image (e.g., where no reference dark current image is used) that indicates dark current states for pixels of the image sensor at a current timepoint. In this way, the techniques discussed herein related to acquiring a residual image may be utilized to obtain a refined dark current image without use of a reference dark current image (e.g., where no modified factory calibrated dark current image is available).

At least some disclosed embodiments include subtracting a refined dark current image (or another type of dark current image) from an input image to obtain a dark current corrected image. A system may subsequently filter the dark current corrected image with a motion compensated previous image (or another source of image data) using a weight map. The weight map may be obtained by scaling pixel values of the refined dark current image based upon ambient light conditions. Utilizing ambient light conditions to obtain filter weights for combining a dark current corrected image with another image (e.g., a motion compensated previous image) can account for inaccuracies in the refined dark current image (or other dark current image) used to obtain the dark current corrected image and can mitigate the effects of shot noise during dark current compensation.

Having just described some of the various high-level features and benefits of the disclosed embodiments, attention will now be directed to FIGS. 1 through 17. These Figures illustrate various conceptual representations, architectures, methods, and supporting illustrations related to the disclosed embodiments.

EXAMPLE SYSTEMS AND COMPONENTS

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/ devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more radar sensors (as will be described in more detail hereinbelow), image sensors, microphones, thermometers, barometers, magnetometers, accelerometers, gyroscopes, and/or others.

FIG. 1 also illustrates that the sensor(s) 110 may include SPAD array(s) 112. As depicted in FIG. 1, a SPAD array 112 may comprise an arrangement of SPAD pixels 120 that are each configured to facilitate avalanche events in response to sensing a photon, as described hereinabove. After detecting a photon, the SPAD pixels 120 may be recharged to prepare the SPAD pixels 120 for detecting additional avalanche events. SPAD array(s) 112 may be implemented on a system 100 (e.g., an MR HMD) to facilitate various functions such as, by way of non-limiting example, image capture and/or computer vision tasks.

Furthermore, FIG. 1 illustrates that a system 100 may comprise or be in communication with I/O system(s) 114. I/O system(s) 114 may include any type of input or output device such as, byway of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), other devices (e.g., self-driving vehicles), combinations thereof, etc. A system 100 may take on other forms in accordance with the present disclosure.

Dark Current Compensation Overview

Figure 2:
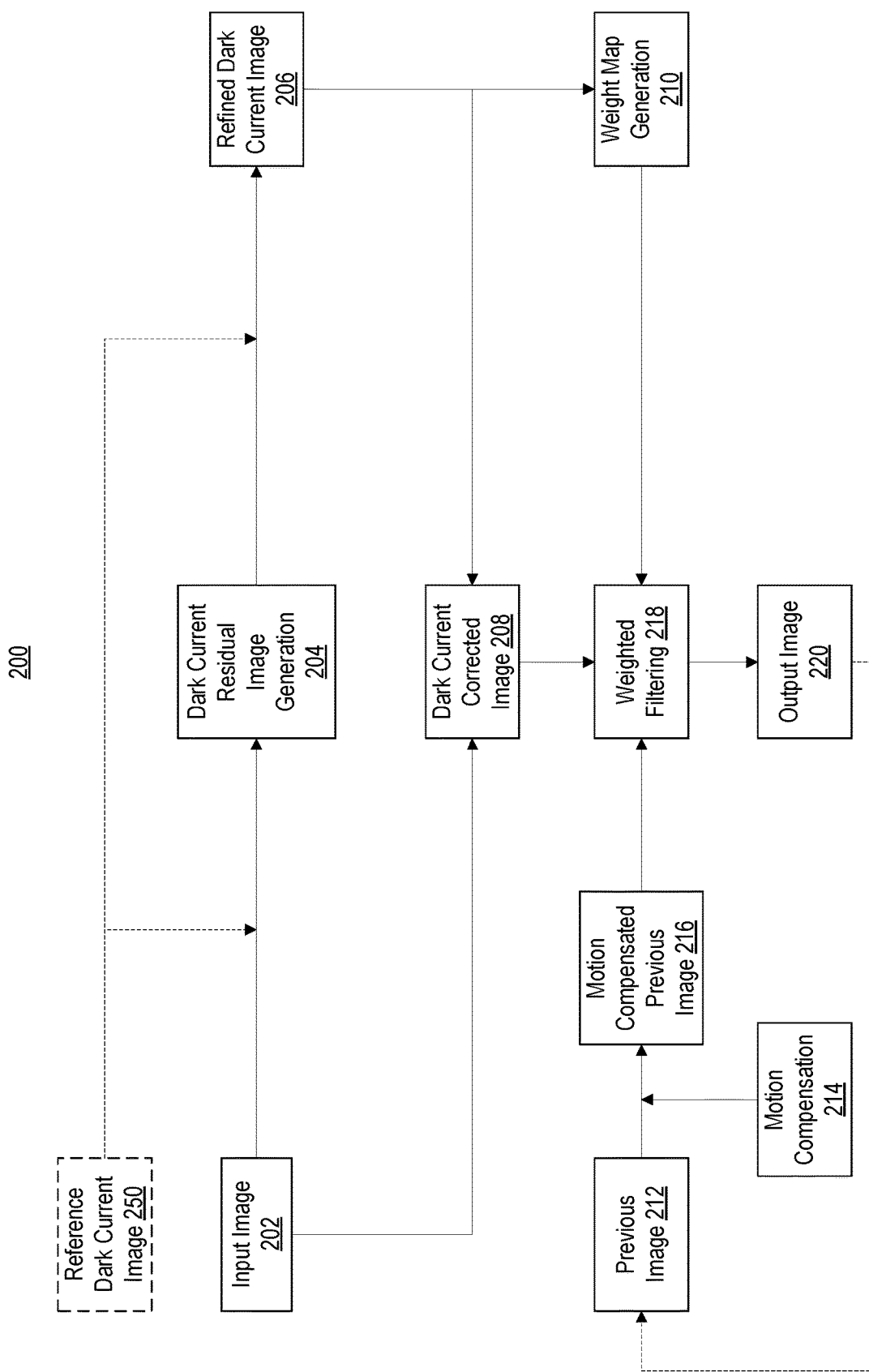
FIG. 2 illustrates a conceptual representation of techniques for generating dark current compensated output imagery.

FIG. 2 illustrates a conceptual representation of techniques for generating dark current compensated output imagery. The example of FIG. 2 depicts an overall filter 200 configured to generate an output image 220. In the example of FIG. 2, at least an input image 202 and a previous image 212 are utilized to generate the output image 220. In some instances, a reference dark current image 250 is utilized as an additional input for generating the output image 220. In some implementations, the input image 202, the previous image, and the reference dark current image 250 are in linear space (e.g., with digital numbers representing photon counts).

The input image 202 may comprise an image acquired by and/or obtained from an image sensor (e.g., SPAD array(s) 112, or another type of image sensor). The previous image 212 may comprise an output image from a previous filtering iteration (indicated in FIG. 2 by the dashed line extending from the output image 220 to the previous image 212). In implementations where a reference dark current image 250 is used, the reference dark current image 250 may comprise a modified factory calibrated dark current image, which may be adjusted or modified based upon image capture conditions associated with the input image 202 (e.g., temperature).

In the example of FIG. 2, the output image 220 comprises a filtered and dark current-subtracted version of the input image 202. The output image 220 may comprise a linear image, and additional postprocessing steps may be performed on the output image 220, such as converting the output image 220 into gamma space, applying gain, performing tone mapping, and/or other operations to generate a final image for display to a user.

In some implementations, the input image 202 and the reference dark current image 250 are utilized as input to dark current residual image generation 204. For instance, the reference dark current image 250 may be subtracted from the input image 202 to obtain a dark current corrected input image, which is then processed to perform dark current residual image generation 204.

A system may utilize a dark current residual image (obtained via the dark current residual image generation 204) to improve the reference dark current image 250 to obtain a refined dark current image 206. For instance, the dark current residual image may be added to the reference dark current image 250 to provide the refined dark current image 206. Over time, new faulty pixels may emerge in the image sensor that captures the input image 202 that did not exist when the image sensor captured imagery to form the reference dark current image 250. Similarly, pixels that were initially faulty when capturing imagery to form the reference dark current image 250 may become non-faulty over time.

The dark current residual image (obtained via the dark current residual image generation 204) may store data for newly faulty pixels (e.g., photon counts) and for newly non-faulty pixels (e.g., negative photon counts) such that adding/combining the dark current residual image to the reference dark current image 250 provides an updated or refined dark current image 206 that more accurately reflects the present dark current statuses of pixels of the image sensor. In some instances, negative pixel values in the refined dark current image 206 are changed to 0.

In some implementations, the input image 202 is utilized as input to dark current residual image generation 204 (without additionally utilizing a reference dark current image 250 as input). In such implementations, the dark current residual image obtained via the dark current residual image generation 204 may represent the current dark current states of pixels of the image sensor that acquired the input image 202 (rather than representing changes in states relative to a reference dark current image 250). The residual image may thus itself be utilized as a refined dark current image 206 within the filter 200 (e.g., without adding the residual image to the reference dark current image 250).

Additional details related to the dark current residual image generation 204 will be provided hereinafter with reference to FIGS. 4-8.

In the example of FIG. 2, the refined dark current image 206 (whether obtained by utilizing the input image 202 alone or by utilizing the input image 202 and the reference dark current image 250 as input to dark current residual image generation 204) is subtracted from the input image 202 to provide a dark current corrected image 208. In some implementations, weighted filtering 218 is performed to combine the dark current corrected image 208 with a motion compensated previous image 216. The motion compensated previous image 216 can be obtained by applying motion compensation 214 (e.g., using pose information, such as IMU and/or other data) to a previous image 212 (e.g., where the previous image 212 is an output image of a preceding iteration of the filter 200).

In the example of FIG. 2, the weighted filtering 218 that combines (e.g., averages) the dark current corrected image 208 with the motion compensated previous image 216 utilizes a weight map obtained via weight map generation 210. The weight map includes per-pixel weight values that balance the influence of pixels of the dark current corrected image 208 and the motion compensated previous image 216 in the output image 220. In the example of FIG. 2, the per-pixel weight values of the weight map are obtained using the refined dark current image 206 used to obtain the dark current corrected image 208.

By way of illustrative, non-limiting example, a pixel weight value of the weight map may be represented as w (with a value ranging between 0 and 1), $I_{prev}$ may represent a pixel value of the motion compensated previous image 216 for the same pixel coordinate as the weight value, and $I_{cur}$ may represent a pixel value of the dark current corrected image 208 for the same pixel coordinate as the weight value. The pixel value for the same pixel coordinate in the output image 220 may be determined as $(1-w)*I_{prev}+w*I_{cur}$. Additional details related to the weight map generation 210 will be provided hereinafter.

The per-pixel weight values of the weight map obtained via the weight map generation 210 may include additional or alternative components, such as weight components that account for large amounts of camera motion (e.g., giving greater weight to dark current corrected image 208 in response to high amounts of camera motion), weight components that account for moving objects in the scene (e.g., by comparing pixel intensities of the dark current corrected image 208 and the motion compensated previous image 216 and giving greater weight to the dark current corrected image 208 when large intensity differences exist), and/or others.

As noted above, the output image 220 (obtained by the weighted filtering 218 of the dark current corrected image 208 and the motion compensated previous image 216 using the weight map formed by weight map generation 210) may be utilized as a previous image for a subsequent iteration of the filter 200 (e.g., employing a recursive strategy known as infinite impulse response (IIR) filter).

Reference Dark Current Images

Figure 3:
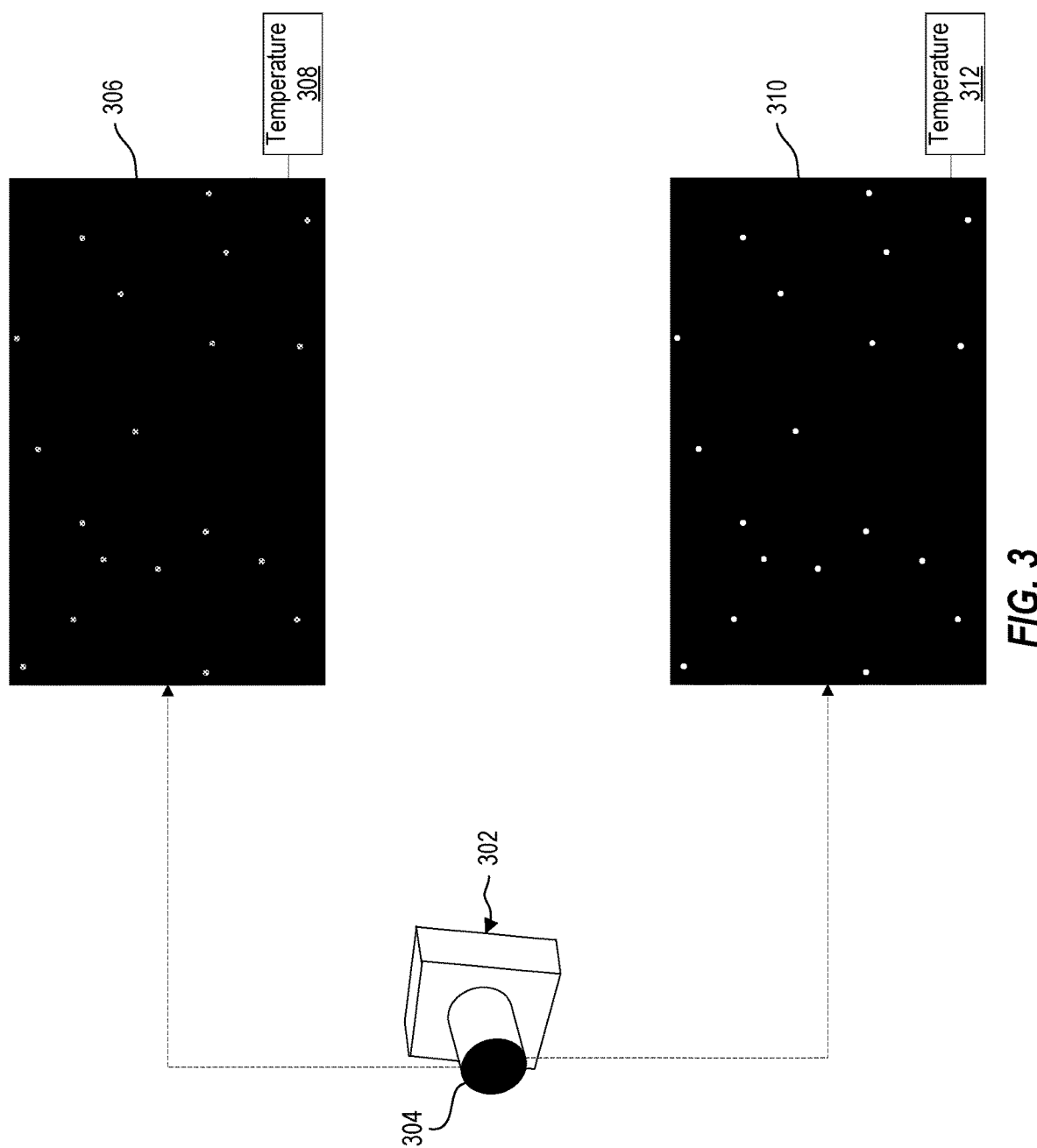
FIG. 3 illustrates a conceptual representation of acquiring factory calibrated dark current imagery.

As noted above, in some instances, a reference dark current image 250 as used in the filter 200 may comprise a modified factory calibrated dark current image. FIG. 3 illustrates a conceptual representation of acquiring a factory calibrated dark current imagery, which can then be modified based upon current image capture conditions to provide a reference dark current image 250 (e.g., for use in components of the filter 200).

In particular, FIG. 3 depicts an image sensor 302 with a cover 304 placed over the image sensing region thereof to prevent incoming light from reaching the active portion of the image sensor 302. By preventing incoming light while performing image acquisition with the image sensor 302, resulting imagery may depict the dark current states for image sensing pixels of the image sensor (e.g., to determine faulty vs non-faulty pixels, as well as the severity of faulty pixels).

The image sensor 302 may capture temporally consecutive frames that may be temporally averaged to form factory calibrated dark current images 306 and 310 (or any number of factory calibrated dark current images). Different factory calibrated dark current images 306 and 310 may be acquired in associated with different temperatures of the image sensor 302. For instance, factory calibrated dark current image 306 may be acquired at one temperature 308 (e.g., 30 degrees Celsius), and the image sensor 302 may be subsequently heated to a higher temperature 312 (e.g., 50 degrees Celsius) for acquisition of factory calibrated dark current image 310.

For at least some types of image sensors (e.g., SPAD sensors), dark current count is an exponential function of temperature. Based upon the relationship between dark current counts and temperature, a set of factory calibrated dark current images, such as factory calibrated dark current images 306 and 310 with their associated temperatures 308 and 312, may be utilized to obtain modified factory calibrated dark current images that are tailored to runtime image capture conditions (e.g., runtime temperature).

In one example, each pixel of a modified factory calibrated dark current image for a given runtime temperature may be obtained according to $I(t)=a*2^{b*t}$, where I represents a dark current photon count, t represents the runtime temperature, and a and b are parameters computing using the image capture temperatures 308 and 312 and the known intensity values of corresponding pixels of the factory calibrated dark current images 306 and 310 (additional image capture temperatures and corresponding pixel values from additional factory calibrated dark current images may be utilized). The inverse of b may be regarded as representing the doubling temperature (the temperature at which dark counts double) and a may be regarded as representing the amplitude of dark current.

In one example, different a and b values are computed for each pixel of the image sensor, such that, at runtime, a runtime temperature may be utilized to evaluate each pixel value for a modified factory calibrated dark current image (e.g., via $I(t)=a*2^{b*t}$), which may be usable as a reference dark current image 250 for components of the filter 200. The model $I(t)=a*2^{b*t}$ can enable generation of modified factory calibrated dark current images by interpolation (e.g., where t is between the temperatures 308 and 312) and/or extrapolation (e.g., where t is smaller than temperature 308 and greater than temperature 312).

In some instances, runtime imagery is captured at a different exposure time than an exposure time for capturing the factory calibrated dark current images 306 and 310, such as exposure time. A modified factory calibrated dark current image may be scaled to account for differences in exposure time. For example, if a runtime exposure is twice as long as a factory calibration exposure, the photon counts of the modified factory calibrated dark current image (acquired via model $I(t)=a*2^{b*t}$) may be scaled by a factor of two.

Dynamic Dark Current Images

Figure 4:
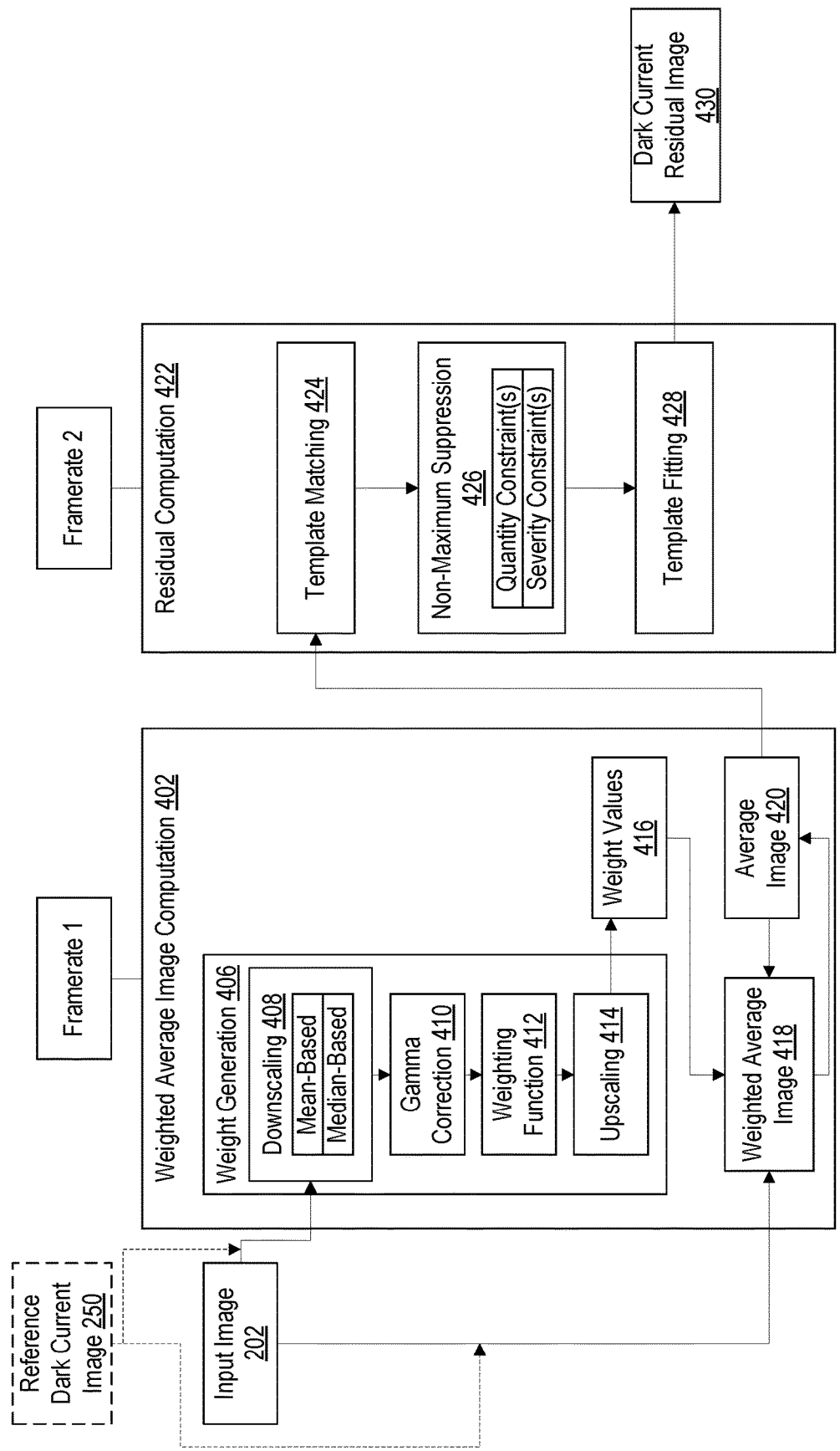
FIG. 4 illustrates a conceptual representation of techniques for generating a dark current residual image using a weighted average image.

FIG. 4 illustrates a conceptual representation of techniques related to dark current residual image generation 204 of FIG. 2. As noted shown in FIG. 4, dark current residual image generation includes two main components: weighted average image computation 402 and residual computation 422. The weighted average image computation 402 obtains a weighted temporal average of incoming frames, and the residual computation 422 utilizes the weighted average image to detect faulty pixels (and/or other dark current states of pixels) to output a dark current residual image.

FIG. 4 depicts that the weighted average image computation 402 may be performed at a first framerate (denoted as framerate 1), and the residual computation 422 may be performed at a second framerate (denoted as framerate 2). Framerate 1 for the weighted average image computation 402 may be higher than framerate 2 for the residual computation 422 (e.g., because the residual image is expected to change slowly over time). The weighted average image computation 402 may utilize full input images 202 or may utilize a tiled or other sparse approach (e.g., to reduce computational costs). For example, input images may be divided into tiles (e.g., horizontal or vertical), and one or more tiles of input images may be processed to update the weighted average image (tiles at different spatial positions may be used for consecutive input images, such as a top tile for a first image, a middle tile for a second image, etc.).

In the example of FIG. 4, in accordance with the weighted average image computation 402, the input image 202 and an average image 420 are combined to form a weighted average image 418 using weight values 416. In some instances, the reference dark current image 250 is subtracted from the input image 202, and the result is combined with the average image 420 using the weight values 416 to form the weighted average image 418. The average image 420 may comprise a weighted average image computed from a preceding iteration. The average image 420 may be regularly updated with newly computed weighted average images (as indicated by the dashed arrow extending from the weighted average image 418 to the previous image 420). The weighted average image 418 may thus become a previous image usable to generate a subsequent weighted average image.

Stated differently, the weighted average image computation 402 utilizes an IIR filter to obtain average images. In one example, where w represents the weight from the weight values 416, $I_{avg}$ denotes photon counts for a pixel in the average image 420, and $I_{cur}$ denotes photon counts for a corresponding pixel in the input image 202 (or dark current subtracted input image after subtraction of the reference dark current image 250 from the input image 202), pixels of the average image 420 may be computed by $I_{avg}=(1-W)*I_{avg}+W*I_{cur}$. In some implementations, no motion compensation is performed to align temporally consecutive input images and the average image 420 (e.g., to allow the effects of faulty pixels to accumulate at respective pixel coordinates across average images).

Additional details will now be discussed related to weight generation 406 for generating the weight values 416 (e.g., W) usable to combine an average image 420 with an input image 202 (potentially modified by a reference dark current image 250) to obtain a weighted average image 418. Although FIG. 4 focuses on an example in which weight generation 406 is performed, a fixed weight value could instead be used to combine an average image 420 with an input image 202 (potentially modified by a reference dark current image 250) in accordance with the present disclosure. In some instances, performing weight generation 406 can provide weights that advantageously give preference to pixels that observe scene portions with little light compared to pixels that observe bright scene portions. For instance, because of shot noise, the variance of photon counts becomes high for brighter pixels, which can cause the photon count offset caused by a faulty pixel to lie beneath the noise floor (and thus unlikely to be visible in the average image 420).

The weights obtained by weight generation 406 may thus appropriately emphasize pixels that observe low light portions of a captured scene. In some implementations, weight generation 406 involves determining region-based weight values from each pixel of the input image 202 (or a dark current corrected image obtained by subtracting the reference dark current image 250 from the input image 202). For each input pixel, the region-based weight value may be determined based upon the light level of the region in which the input pixel lies.

As shown in FIG. 4, in some implementations, the weight generation 406 may include downscaling 408, which may be performed to mitigate image noise. Each pixel in the downscaled image may represent a respective set of pixels (or pixel coordinates) in the input image 202 (or input image 202 corrected by the reference dark current image 250). Each pixel in the downscaled image may thus be used to determine the region-based weight value for its respective set of pixels (or pixel coordinates). Other techniques aside from downscaling for associating a single region-based weight value for a set of pixels (or pixel coordinates) from the input image may be utilized (e.g., segmenting or partitioning the input image and calculating weights from pixel values within each segment or partition).

When downscaling 408 is utilized, the downscaling 408 may implement any suitable downsampling techniques, such as median-based downscaling, mean-based downscaling, a combinations thereof, iterative downscaling (e.g., pyramid-based downscaling), and/or others. In one example, the downscaling 408 utilizes a pyramid-based downscaling approach, in which, to go from the current pyramid level to the next pyramid level, 2×2 pixels (or any pixel block size) of the current resolution (current pyramid level) are combined into one pixel of the lower resolution (next pyramid level). In one example, 4 of such pyramid-based downscaling operations are applied, resulting in a final low-resolution image that is $1/16^{th}$ of the original width and height (of the input image 202 or an image formed by subtracting the reference dark current image 250 from the input image 202). Any number of pyramid-based downscaling operations may be applied.

In some instances, the downscaling 408 includes performing a combination of different types of downscaling operations, such as a combination of mean-based downscaling operations and median-based downscaling operations. In one example, downscaling 408 involves performing one or more mean-based downscaling operations prior to performing one or more median-based downscaling operation. In some instances, median-based downscaling can mitigate large outliers caused by faulty pixels. The order of performing median- and mean-based downscaling may be changed in accordance with implementations of the present disclosure. In some instances, performing mean-based downscaling prior to median-based downscaling contributes to computational efficiency.

As indicated above, pixel values of the downscaled image (obtained by downscaling 408) may be utilized to determine region-based weight values 416 for determining the average image 418. Various operations may be performed on the pixels of the downscaled image to determine the weight values 416. In the example of FIG. 4, gamma correction 410 is applied to convert pixels of the downscaled image into gamma space (providing a gamma corrected downscaled image).

Furthermore, in the example of FIG. 4, a weighting function 412 is applied to pixels of the gamma corrected downscaled image (providing a weighted gamma corrected downscaled image). The weighting function 412 may take on various forms, such as a Gaussian function that assigns weight values that are inversely related to pixel light level. In one example, a Gaussian weighting function such as $W(I)=\exp(-0.5*I^2/\sigma^2)$ may be implemented, where I is the intensity reading from the gamma corrected downscaled image. σ may be set in various ways. In one implementation, σ is selected to cause lower weights to be assigned for pixels in the gamma corrected downscaled image that have high intensity values under a maximum gain setting (e.g., 100, or another maximum gain value). For instance, σ may be selected such that 2*σ=255/(maximum gain).

After application of the weighting function 412, the weighted gamma corrected downscaled image may be subjected to upscaling 414 to derive the weight values 416 for each pixel of the original resolution of the input image 202. As noted above, other techniques aside from those discussed above may be employed to determine the weight values 416. A system may utilize the weight values 416 to combine the average image 420 (e.g., a previously calculated weighted average image) with the input image 202 (potentially modified by the reference dark current image 250) to obtain the weighted average image 418.

As shown in FIG. 4, the average image 420 (which comprises a weighted average image) is utilized as input to residual computation 422 to determine a dark current residual image 430. When the input image 202 as modified by the reference dark current image 250 (e.g., a dark current corrected image) is utilized as input to the weighted average image computation 402, the resulting dark current residual image 430 may indicate differences in dark current states of pixels relative to the reference dark current image 250. Such a dark current residual image 430 may be utilized to modify the reference dark current image 250 (e.g., by addition) to obtain a refined dark current image 206 for subtraction from the input image 202 to facilitate dark current compensation (see, briefly, FIG. 2).

When the input image 202 is used as input to the weighted average image computation 402 without initial modification by the reference dark current image 250, the dark current residual image 430 may indicate dark current states for pixels in absolute terms. For instance, such a dark current residual image 430 may itself be utilized as the refined dark current image 206 for subtraction from the input image 202 to facilitate dark current compensation (see, briefly, FIG. 2).

Residual computation 422 may comprise various components, such as template matching 424, non-maximum suppression 426, and template fitting 428. Different embodiments may implement different components and/or combinations of components of residual computation 422. Additional details related to template matching 424 will be discussed with reference to FIG. 5, additional details related to non-maximum suppression 426 will be discussed with reference to FIGS. 6 and 7, and additional details related to template fitting 428 will be discussed with reference to FIG. 8.

Figure 5:
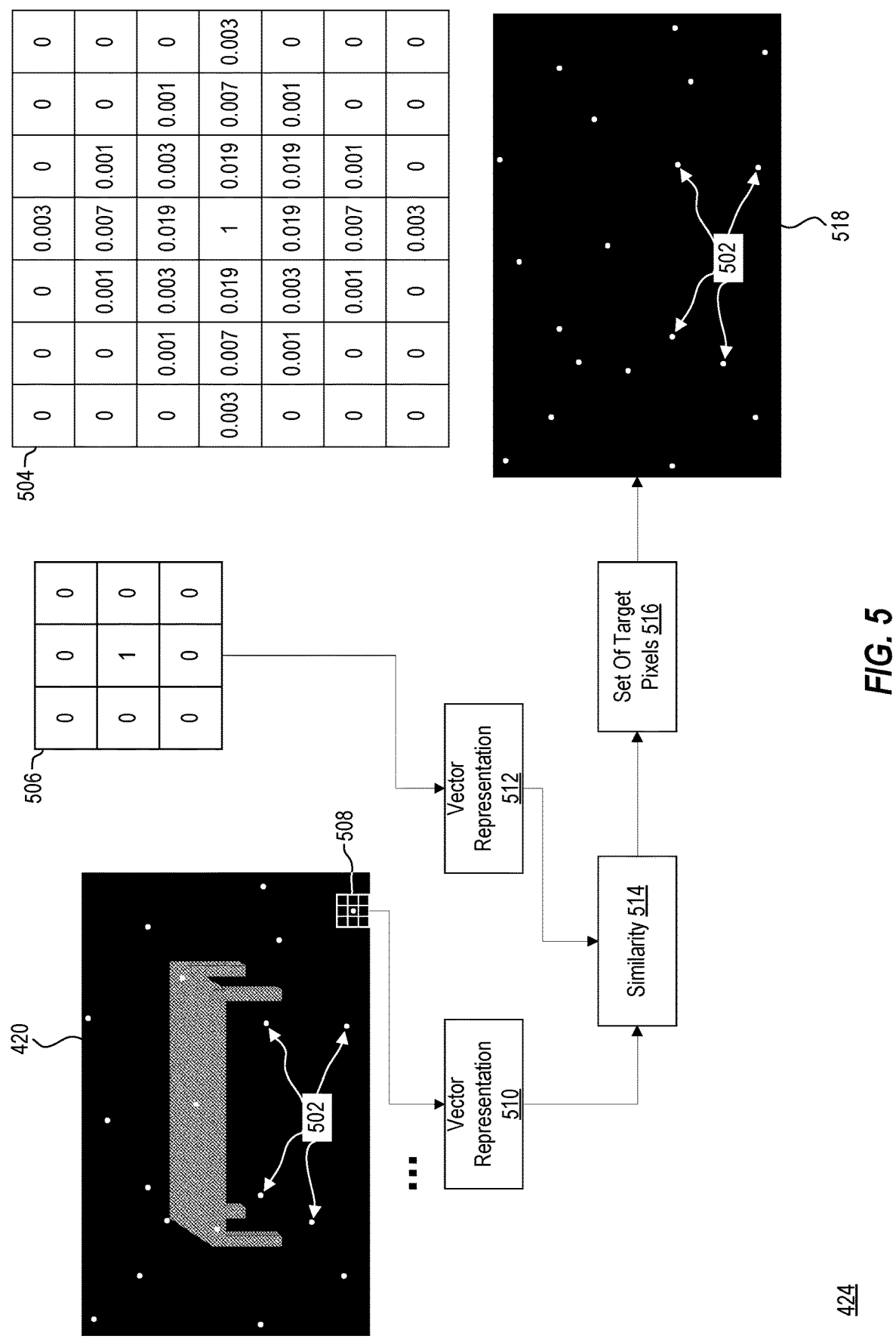
FIG. 5 illustrates a conceptual representation of performing template matching pursuant to generating a dark current residual image.

FIG. 5 illustrates a conceptual representation of performing template matching 424 pursuant to generating a dark current residual image 430. FIG. 5 shows a conceptual representation of an average image 420 as discussed above with reference to FIG. 4. The average image 420 as shown in FIG. 5 captures a table within a low light environment and includes faulty pixels 502 brought about by dark current. The average image 420 is obtained by utilizing an input image 202 as input to the weighted average image computation 402 (without first modifying the input image 202 with the reference dark current image). Template matching 424 may be performed to identify the locations of faulty pixels 502 within the average image 420 to form a dark current residual image 430. Although the present example focuses on performing template matching 424 on an average image 420, the principles discussed herein related to template matching 424 may be performed on any type of image.

In the example of FIG. 5, template matching 424 utilizes a target pixel template that indicates characteristics of faulty pixels. FIG. 5 displays example pixel templates 504 and 506, which indicate that faulty pixels can be characterized as having high pixel values relative to neighboring pixels. In the pixel templates 504 and 506, the faulty pixel is located at the center pixel position. Pixel template 504 (a 7×7 template) captures more information than pixel template 506 about the effect that a faulty pixel has on its neighbors. However, pixel template 506 (a 3×3 template) is more sparse than pixel template 504 (with nearly all pixels having a value of 0) and may be utilized to reduce computational costs. Other types of target pixel templates may be utilized in accordance with implementations of the present disclosure.

In the example of FIG. 5, a system identifies pixel template 504 as a target pixel template for use in template matching 424. The system identifies a pixel window 508 associated with (or centered on) each pixel of the input image. The pixel window size matches the size of the pixel template 504. FIG. 5 shows an example target pixel window 508 centered on a pixel of the average image 420. Template matching 424 involves determining similarity 514 between the target pixel template 504 and the pixel window 508. Based on whether the similarity 514 satisfies one or more similarity conditions, the pixel associated with the pixel window 508 may be added to a set of target pixels 516. The ellipsis indicates that similarity may be determined between the target pixel template 504 and each pixel window for each pixel of the average image 420 to establish the set of target pixels 516.

In some implementations, to facilitate assessment of similarity between the target pixel template 506 and the pixel window 508, a system identifies a vector representation 512 of the target pixel template 506 and generates a vector representation 510 of the pixel window 508. The vector representation 510 of the pixel window 508 may be obtained by normalizing the pixel window 508 for offset and gain. Offset normalization may be accomplished by determining an average pixel value using all pixels of the pixel window 508 except for the center pixel and subtracting the average pixel value from each pixel of the pixel window 508. By way of illustrative example, a 3×3 pixel window with pixel values of [5, 5, 5; 5, 10, 5; 5, 5, 5] may be offset-normalized to [0, 0, 0; 0, 5, 0; 0, 0, 0].

Gain normalization may be accomplished by converting the offset-normalized pixel window may be converted into a vector, and its unit vector may be defined as the vector representation 510 of the pixel window 508. Continuing with the above illustrative example, an offset-normalized pixel window [0, 0, 0; 0, 5, 0; 0, 0, 0] may be converted into the vector [0; 0; 0; 0; 5; 0; 0; 0; 0], providing the unit vector of [0; 0; 0; 0; 1; 0; 0; 0; 0].

The vector representation 510 of the pixel window 508 may be compared to the vector representation 512 of the target pixel template 506 to obtain the similarity 514 (e.g., a similarity score). Various comparison techniques are within the scope of the present disclosure, such as, by way of non-limiting example, dot product, cosine similarity, Euclidean distance, and/or others. A dot product comparison may be used to provide similarity scores between −1 and 1, with 1 indicating maximum similarity and −1 indicating maximum dissimilarity. Continuing with the above illustrative example, a dot product between the unit vector [0; 0; 0; 0; 1; 0; 0; 0; 0] representing a pixel window and the vector representation 512 of the target pixel template 506 (i.e., [0; 0; 0; 0; 1; 0; 0; 0; 0]) provides a value of 1, indicating maximum similarity, indicating that the pixel about which the pixel window is centered is a faulty pixel.

A similarity 514 obtained between vector representations 510 and 512 of a pixel window 508 and a target pixel template 506, respectively, may be compared to one or more similarity thresholds to determine whether to include the pixel associated with the pixel window 508 in the set of target pixels 516. For example, for scores computed via dot product, similarity scores that are equal to or greater than 0.7 (or another value) may trigger addition of pixels associated with applicable pixel windows to the set of target pixels 516 for forming the dark current state image 518. Pixel coordinates and/or pixel values (e.g., after offset normalization) associated with pixels of the set of target pixels 516 may be stored and/or utilized to form the dark current state image 518. In the example of FIG. 5, the dark current state image 518 indicates coordinates and magnitudes of faulty pixels 502, while non-faulty pixels are represented in black.

The dark current state image 518, indicating dark current statuses for pixels of an image sensor, may be utilized as a dark current residual image 430, or additional processing may be performed thereon to form the residual image 430 (e.g., non-maximum suppression 426, template fitting 428, etc.)

The example of FIG. 5 focuses on an instance where the average image 420 is computed using an input image 202 without first subtracting dark current therefrom via the reference dark current image 250. When the average image 420 is computed using a dark current corrected image obtained by subtracting the reference dark current image 250 from the input image 202, the average image 420 and the dark current state image obtained by template matching 424 may depict pixels that have become newly faulty, pixels that have become newly non-faulty, and pixels that have not changed (relative to the reference dark current image 250).

For example, similarity scores (e.g., similarity 514) may be assessed relative to multiple thresholds, such as an upper threshold (e.g., 0.7, or another value) and a lower threshold (e.g., −0.7, or another value). When a similarity score satisfies the upper threshold (e.g., the score is equal to or greater than the upper threshold), the associated pixel may be classified as a newly faulty pixel within the set of target pixels 516. When the similarity score satisfies the lower threshold (e.g., the score is equal to or less than the lower threshold), the associated pixel may be classified as a newly non-faulty pixel within the set of target pixels 516. When the similarity score satisfies neither threshold, the pixel may be classified as having not changed (or the pixel may be omitted from the set of target pixels 516). In this regard, the set of target pixels 516 may include multiple subsets of pixels, each being associated with different dark current states (e.g., newly faulty, newly non-faulty, etc.). The dark current state image 518 generated using the set of target pixels may indicate different types of dark current states with different types of pixel values (e.g., positive values for newly faulty pixels, negative values for newly non-faulty pixels, etc.).

Figure 7:
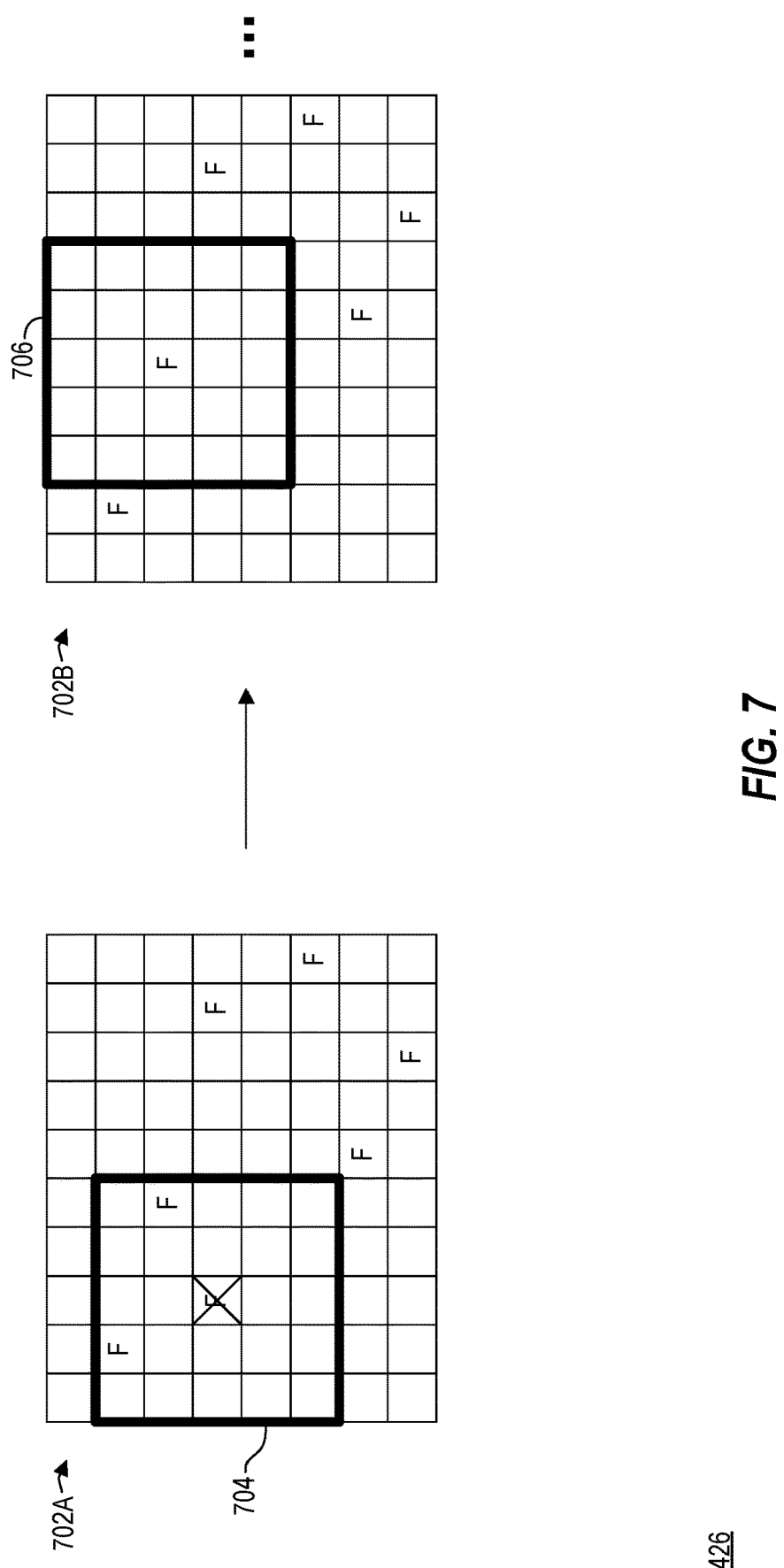

FIGS. 6 and 7 illustrate conceptual representations of performing non-maximum suppression 426 pursuant to generating a dark current residual image 430. Non-maximum suppression may be performed on a dark current state image 518 or any other type of image indicating locations and/or magnitudes of faulty pixels.

Often, the number of faulty pixels is small compared to the total number of pixels of an image sensor. Non-maximum suppression may be regarded as a safety mechanism that enforces sparseness to mitigate the effects of potential inaccuracies in template matching 424 (e.g., where an excessive number of pixels near one another are erroneously determined to be faulty).

FIG. 6 depicts a part of an input image 602, which, as noted above, may comprise a dark current state image 518 computed by template matching 424, or another type of image indicating dark current states for pixels (e.g., indicating the locations of faulty pixels or newly non-faulty pixels). In FIG. 6, faulty or newly faulty pixels are denoted by the character "F" within pixel squares of the input image 602. Non-faulty or no change pixels are denoted in FIG. 6 with blank squares.

Pursuant to non-maximum suppression 426, a system may partition the input image 602 into different partitions 604. In the example of FIG. 6, the partitions 604 comprise 4×4 sets of pixels, though any partition size may be utilized in accordance with the present disclosure. FIG. 6 also depicts an updated input image 606, which may be generated by imposing one or more quantity constraints and/or severity constraints to pixels within each of the partitions 604. The quantity and/or severity constraints may be associated with a particular type of dark current state (e.g., the faulty state, or the newly faulty state).

In some implementations, for a particular partition 604, imposing the quantity constraint(s) may comprise changing the dark current states of all faulty or newly faulty pixels within the partition 604 to a different dark current state (e.g., to a non-faulty state or a no change state), except for one or more faulty or newly faulty pixels within the partition 604 that have a highest magnitude/pixel value (e.g., highest light level or positive pixel value). For instance, FIG. 6 illustrates in the input image 602 various pixels with the faulty or newly faulty designation ("F") including an X placed thereover, indicating a change for such pixels from the faulty or newly faulty designation to a different dark current state designation (e.g., non-faulty or no change) pursuant to imposition of the quantity constraint(s).

In some implementations, one or more severity constraints are applied to the one or more faulty or newly faulty pixels that remain in the various partitions 604 after application of the quantity constraint(s). For instance, the remaining faulty or newly faulty pixels may be compared to a magnitude threshold (or a pixel value threshold), and pixels that fail to satisfy the magnitude threshold may also be changed from the faulty or newly faulty state (e.g., to the non-faulty or no change state).

The updated input image 606 of FIG. 6 reflects the dark current state changes for pixels of the input image 602 brought about by imposition of the quantity constraint(s) and/or the severity constraint(s) (e.g., F pixels with an X placed thereover in the input image 602 are changed to blank squares in the updated input image 606). In some implementations, imposition of the quantity constraint(s) and/or the severity constraint(s) may be reiterated. For instance, FIG. 6 depicts partitioning of the updated input image 606 with updated partitions 608 that are spatially offset from the partitions 604 of the input image 602. In the example of FIG. 6, the updated partitions 608 of the updated input image 606 are shifted two pixels to the right and two pixels down with respect to the partitions 604 of the input image 602 (other spatial offsets are within the scope of the president disclosure). The system may reapply the quantity constraint(s) and the severity constraint(s) to the updated partitions 608 to mitigate faulty pixel detections that are spatially close to one another.

A system may iteratively update partitions and impose the quantity constraint(s) and the severity constraint(s) until a stop condition is satisfied. For instance, a stop condition may comprise performance of a predetermined number of iterations (e.g., 2 or more iterations), or reaching a predetermined quantity of faulty or newly faulty pixels. In some implementations, different partition sizes and/or different quantity or severity constraints may be applied in different iterations.

FIG. 7 illustrates a conceptual representation of an alternative technique for achieving non-maximum suppression 426. FIG. 7 shows an input image 702A (similar to input image 602) with faulty or newly faulty pixel states indicated by the character "F" and with non-faulty or no change pixel states indicated by blank squares. In the example of FIG. 7, the input image 702A includes a pixel window 704 of a predefined pixel window size localized (e.g., centered) on a faulty pixel of the input image 702A. In some implementations, a system imposes one or more quantity constraints and/or one or more severity constraints on pixels within the pixel window 704. In some implementations, imposing the quantity constraint(s) and/or the severity constraint(s) may include determining whether other faulty or newly faulty pixels exist within the pixel window 704 with a greater magnitude or pixel value than the pixel on which the pixel window 704 is localized (e.g., the center pixel). In response to determining that other faulty or newly faulty pixels exist in the pixel window 704 with a greater magnitude or pixel value, the system may change the dark current state for the pixel on which the pixel window 704 is localized (e.g., the center pixel) to a different dark current state (e.g., the non-faulty state or the no change state).

In the example of FIG. 7, the center pixel of the pixel window 704 comprises a smaller magnitude or pixel value than at least some of the other faulty or newly faulty pixels in the pixel window. FIG. 7 thus depicts the center pixel of the pixel window 704 with an X therethrough, indicating a change of the center pixel to a different dark current state (e.g., the non-faulty or no change state). FIG. 7 depicts this center pixel with a blank square in the input image 702B after imposition of the quantity and/or severity constraint(s). The input image 702B of FIG. 7 also depicts another pixel window 706 localized on a different faulty or newly faulty pixel of the input image 702B, indicating that quantity and/or severity constraints may be applied to pixel windows localized on any number of the faulty or non-faulty pixels in the input image 702A, 702B, thereby providing an updated input image.

Although the examples of FIGS. 6 and 7 have focused on imposing quantity and/or severity constraints in association with the faulty or newly faulty dark current states to facilitate non-maximum suppression, the principles discussed above may be applied for other types of dark current states. For instance, the partition and/or pixel window techniques discussed above with reference to FIGS. 6 and 7 may be applied to impose quantity and/or severity constraints related to newly non-faulty pixels (e.g., pixels with a negative magnitude), such as by constraining the quantity and/or severity of newly non-faulty pixels in partitions or pixel windows of an input image. Newly non-faulty pixels that satisfy certain conditions may be changed to a different dark current state (e.g., the no change state).

In some implementations, non-maximum suppression 426 and non-minimum suppression are performed sequentially (or in parallel) to form a single updated input image. Other techniques for facilitating non-maximum and/or non-minimum suppression than those discussed above may be implemented in accordance with the present disclosure (e.g., maintaining only a pre-set quantity of newly faulty pixels and/or newly non-faulty pixels in an updated input image, regardless of pixel location).

An updated input image obtained by application of non-maximum suppression 426 and/or non-minimum suppression may be utilized as a residual image 430. In some implementations, additional processing, such as template fitting 428, is performed on imagery that has been subjected to non-maximum suppression and/or non-minimum suppression in order to obtain the residual image 430.

Figure 8:
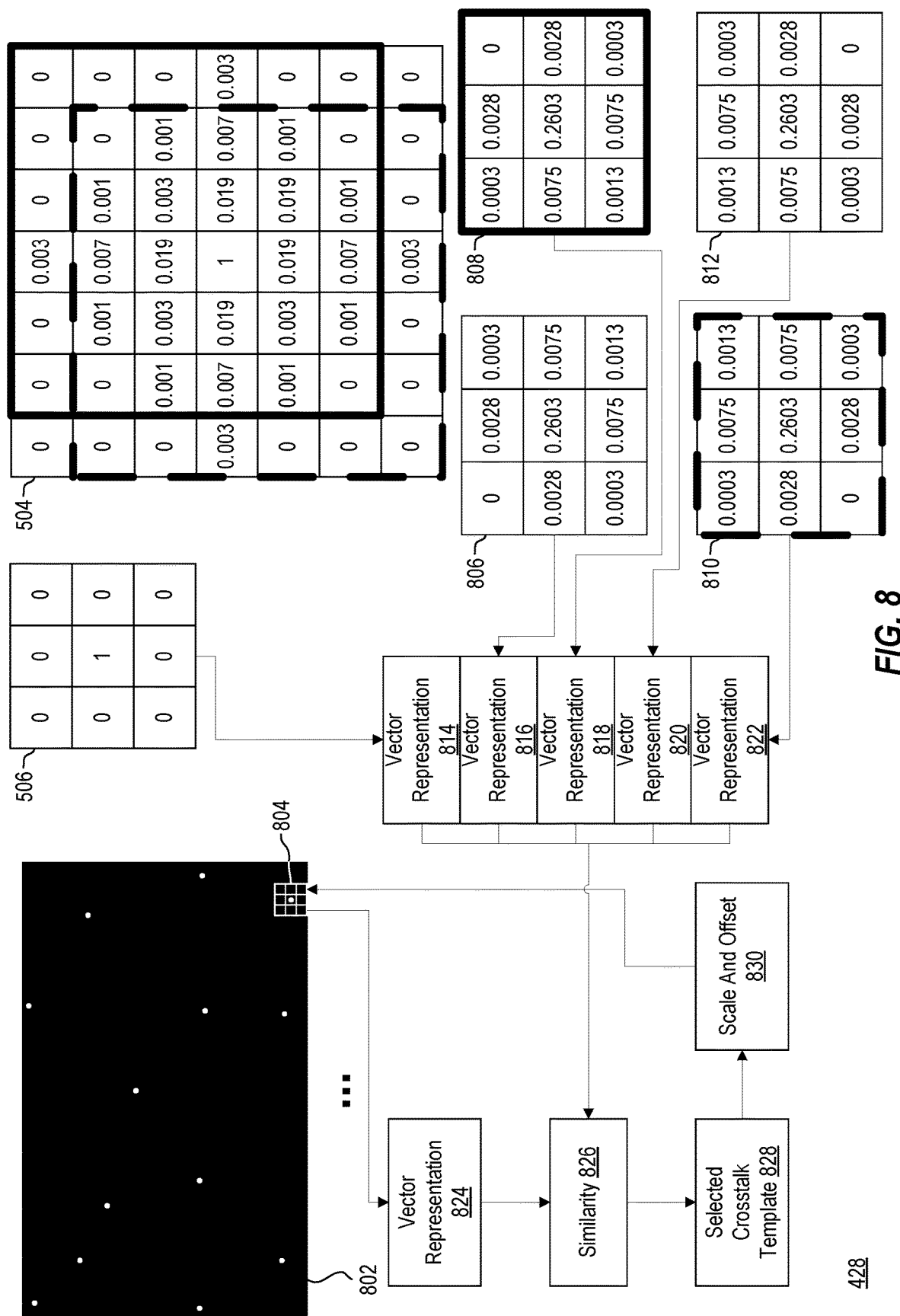
FIG. 8 illustrates a conceptual representation of performing template fitting pursuant to generating a dark current residual image.

FIG. 8 illustrates a conceptual representation of performing template fitting 428 pursuant to generating a dark current residual image 430. Template fitting 428 may be performed on any image indicating dark current states of pixels (e.g., a reference dark current image 250, an image subjected to template matching 424, non-maximum suppression 426, and/or non-minimum suppression, etc.).

FIG. 8 illustrates an input image 802, which comprise an image on which template matching 424 and non-maximum suppression 426 have been performed. The input image 802 distinguishes between faulty pixels (depicted in white) and non-faulty pixels (depicted in black). The input image 802 fails to model cross-talk between adjacent pixels and thus fails to capture the effects that a faulty pixel has on its neighbors. Thus, utilizing the input image 802 to compensate for dark current in runtime imagery can lead to artifacts, especially when operating under high gain settings. Template fitting 428 as described herein may be performed to generate a dark current residual image 430 that models crosstalk between faulty pixels and their neighboring pixels, thereby reducing artifacts in dark current compensated imagery.

FIG. 8 depicts pixel templates 504 and 506, which model crosstalk between faulty pixels (in the center of the pixel templates 504 and 506) and their neighboring pixels with different levels of granularity. When an input image 202 for which dark current compensation is to be performed is captured in an unbinned mode (where each image sensor pixel captures a respective signal for the image), template fitting 428 may include selecting pixel template 504 or 506 as a crosstalk template for application to different faulty pixels of the input image 802. For instance, for a given faulty pixel of the input image 802, the crosstalk template 504 or 506 may be scaled according to the light level of the given faulty pixel, and the scaled template 504 or 506 may be copied to (e.g., centered on) the pixel position of the given faulty pixel.

When an input image 202 for which dark current compensation is to be performed is captured in a binned mode (where signals of image sensor pixels are combined to form the image), additional crosstalk templates, such as templates 806, 808, 810, and 812, may be obtained by sampling from pixel template 504. In the example of FIG. 8, pixels of the templates 806, 808, 810, and 812 are obtained by averaging 2×2 pixel regions from pixel template 504 (e.g., the matching borders of templates 808 and 810 in pixel template 504 indicate regions sampled from pixel template 504 to form templates 808 and 810).

The manner in which additional templates are sampled from a base template (e.g., pixel template 504) may correspond to the binning mode of the image sensor that captures the input image 202. For instance, where the image sensor employs 2×2 binning, 2×2 sampling may be utilized to sample from the base template to obtain additional crosstalk templates.

When accounting for a binned image acquisition mode, template fitting 428 may include selecting a crosstalk template from available crosstalk templates (e.g., templates 506, 806, 808, 810, and 812) for application to faulty pixels of the input image 802. FIG. 8 illustrates a pixel window 804 that includes a faulty pixel (e.g., the center pixel) and its neighboring pixels. The pixel window 804 may be compared to each of the available crosstalk templates to select a crosstalk template for application to the pixels of the pixel window 804 to accomplish template fitting 428. The process of selecting and applying a crosstalk template to an associated pixel window may be repeated for any number of faulty pixels of the input image 802 (indicated by the ellipsis in FIG. 8).

Selection of a crosstalk template for a pixel window that includes a faulty pixel may be accomplished in various ways. FIG. 8 depicts an example in which a system identifies a vector representation 814, 816, 818, 820, and 822 for each crosstalk template 506, 806, 808, 810, 812, respectively. The vector representations 814, 816, 818, 820, and 822 may be used to facilitate comparison between the crosstalk templates 506, 806, 808, 810, and 812 and the pixel window 804 to select a crosstalk template for application to the pixel window 804.

FIG. 8 furthermore depicts a vector representation 824 generated for the pixel window 804 for comparison to the vector representations 814, 816, 818, 820, and 822 of the crosstalk templates 506, 806, 808, 810, and 812. The vector representation 824 of the pixel window 804 may be generated in a manner similar to the generation of the vector representation 510 of the pixel window 508 discussed above with reference to FIG. 5. For instance, the vector representation 824 may be generated by normalizing the pixel window 804 for offset and gain. Offset normalization may comprise subtracting the average pixel value of pixels of the pixel window 804 from each pixel of the pixel window 804 (in contrast with offset normalization of pixel window 508, the center pixel may be included for offset normalization of the pixel window 804). Gain normalization may comprise converting the pixel window 804 into a vector and determining its unit vector for use as the vector representation 824.

Determining similarity 826 between the vector representation 824 of the pixel window 804 and the vector representations 814, 816, 818, 820, and 822 of the crosstalk templates 506, 806, 808, 810, and 812 may be conceptually similar to determining similarity 514 between the vector representation 510 of the pixel window 508 and the vector representation 512 of the target pixel template 506. For instance, determining the similarity 826 may comprise determining a separate dot product (or other similarity measure) between the vector representation 824 and each of the vector representations 814, 816, 818, 820, and 822. The selected crosstalk template 828 may be selected as the crosstalk template 506, 806, 808, 810, or 812 associated with a vector representation 814, 816, 818, 820, or 822 that results in the highest similarity 826 to the vector representation 824 of the pixel window 804. A system may apply the selected crosstalk template 828 to the pixel window 804 to contribute to a dark current residual image 430 that models crosstalk between faulty pixels and their neighboring pixels. Such a process may be performed for each faulty pixel of the input image 802.

In the example of FIG. 8, applying the selected crosstalk template 828 to the pixel window 804 comprises applying a scale and offset 830 to the selected crosstalk template 828. The scaling and offset 830 may be applied to the selected crosstalk template 828 to account for the different light levels or pixel values associated with the faulty pixel included in the pixel window 804. The scale and offset 830 may be applied to a normalized vector representation of the selected crosstalk template 828. The scale factor may be computed by projecting an offset-normalized (but not gain-normalized) vector representing the pixel window 804 onto the normalized vector representation of the selected crosstalk template 828 and determining the length of the projected vector via the dot product. The computed length may be used as the scale factor for scaling the selected crosstalk template 828. When modeling crosstalk between a faulty pixel and its neighboring pixels, the offset added to the scaled crosstalk template may ensure that all pixels in the crosstalk template represent positive values.

Although the examples discussed with reference to FIG. 8 focus, in at least some respects, on performing template fitting 428 on faulty pixels of an input image 802 that depicts faulty pixels and non-faulty pixels, the principles discussed herein related to template fitting 428 may be applied to other types of pixel states in other types of images. For instance, template fitting 428 may be performed to provide a dark current residual image 430 that models crosstalk between newly faulty pixels and their neighboring pixels. Similarity, template fitting may be performed to provide a dark current residual image 430 that models crosstalk between new non-faulty pixels and their neighboring pixels. When modeling crosstalk for newly non-faulty pixels, the offset applied to the selected crosstalk template may be selected to ensure that all pixel values of the selected crosstalk template become negative.

Referring again to FIG. 4, template matching 424, non-maximum suppression 426 (and/or non-minimum suppression), and/or template fitting 428 may be performed pursuant to residual computation 422 to generate a dark current residual image 430. Referring again to FIG. 2, a dark current residual image 430 may be utilized as a refined dark current image 206, or may be used to modify a reference dark current image 250 to provide a refined dark current image 206.

Dark Current Compensation by Weighted Filtering

As noted above, a refined dark current image 206 may be subtracted from an input image 202 to obtain a dark current corrected image 208. Although the dark current corrected image 208 may have significantly fewer dark current artifacts than the input image 202, dark current subtraction may fail to compensate for all dark counts because of imperfections in the refined dark current image 206. Imperfections in dark current images can be exacerbated during imaging in very low light environments that require high gain settings.

Shot noise can also contribute to artifacts in a dark current corrected image 208 because intensity variance increases for higher intensity values. Faulty pixels result in high intensity values with correspondingly high intensity variance. This high variance lingers after dark current subtraction, which can cause artifacts in a dark current corrected image 208 even if the refined dark current image 206 included no inaccuracies.

Conventional techniques for managing faulty pixels include replacing pixels having dark counts that exceed a threshold with spatial neighbors. Such techniques are associated with various challenges and/or deficiencies. For instance, replacement thresholds can be arbitrary and suitable for some imaging environments and not others. Furthermore, the effects of faulty pixels are not always visible to users (e.g., in well-lit environments), so spatial neighbor replacement in some situations can lead to unnecessary signal discarding. Still furthermore, treating spatial neighbor replacement as a binary decision can lead to unnecessary signal discarding for faulty pixels barely satisfy a threshold.

At least some disclosed embodiments implement non-binary or soft replacement of faulty pixels by weighted filtering. As noted above, in the example of FIG. 2, the refined dark current image 206 is subtracted from the input image 202 to provide a dark current corrected image 208. Weighted filtering 218 is performed to combine the dark current corrected image 208 with a motion compensated previous image 216. The motion compensated previous image 216 can be obtained by applying motion compensation 214 to a previous image 212 (e.g., where the previous image 212 is an output image of a preceding iteration of the filter 200).

The weighted filtering 218 that combines (e.g., averages) the dark current corrected image 208 with the motion compensated previous image 216 utilizes a weight map obtained via weight map generation 210. The weight map includes per-pixel weight values that balance the influence of pixels of the dark current corrected image 208 and the motion compensated previous image 216 in the output image 220. In the example of FIG. 2, the per-pixel weight values of the weight map are obtained using the refined dark current image 206.

By way of illustrative, non-limiting example, a pixel weight value of the weight map may be represented as w (with a value ranging between 0 and 1), $I_{prev}$ may represent a pixel value of the motion compensated previous image 216 for the same pixel coordinate as the weight value, and $I_{cur}$ may represent a pixel value of the dark current corrected image 208 for the same pixel coordinate as the weight value. The pixel value for the same pixel coordinate in the output image 220 may be determined as $(1-w)*I_{prev}+w*I_{cur}$.

Figure 9:
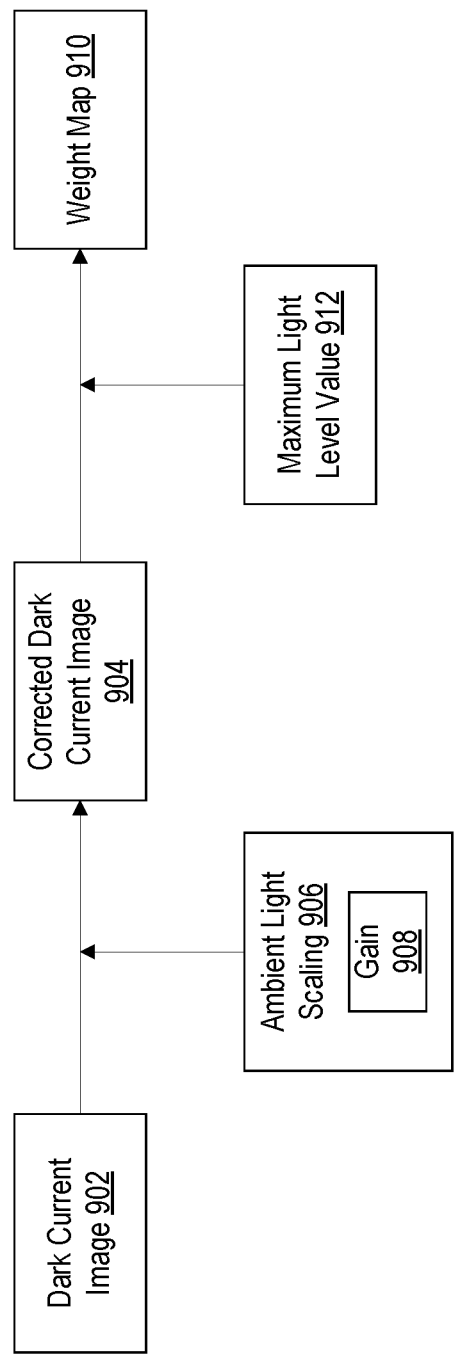
FIG. 9 illustrates a conceptual representation of generating a weight map usable to filter a dark current corrected image with other image data to generate an output image.

FIG. 9 illustrates a conceptual representation of weight map generation 210 for obtaining a weight map usable to filter a dark current corrected image 208 with other image data to generate an output image 220. FIG. 9 indicates that weight map generation 210 may include accessing a dark current image 902, which may comprise a refined dark current image 206 or other dark current image (e.g., a reference dark current image 250, or any image indicating dark current states). Weight map generation 210 further includes generating a corrected dark current image 904 based upon the dark current image 902. In the example of FIG. 9, the corrected dark current image 904 is obtained at least by ambient light scaling 906, which involves scaling pixel values of the dark current image 902 based upon ambient light conditions. Various indications of ambient light conditions may be utilized to facilitate ambient light scaling 906, such as gain 908, output of a light sensor (e.g., a single pixel camera), etc. In some implementations, the gain 908 used to scale pixels of the dark current image 902 to obtain the corrected dark current image 904 is associated with the input image 202 for which dark current compensation is performed.

In some instances, the dark current image 902 is converted into gamma corrected space prior to applying the ambient light scaling 906. Furthermore, in some instances, an initial offset is applied to the dark current image 902 prior to converting into gamma corrected space. The initial offset may be associated with the dark current image 902 (e.g., a baseline pixel offset associated with pixels of the dark current image 902). In some instances, the initial offset is obtained as an average pixel value of a subset of pixels of the dark current image 902 (e.g., an average photon count of a percentage of pixels of the dark current image 902 with the lowest photon counts, such as an average of the lowest 90% of pixels).

Because of the ambient light scaling 906, the corrected dark current image 904 can indicate whether faulty pixels thereof are likely to be perceivable by users. The corrected dark current image 904 may thus be utilized to obtain weights for a weight map 910 that give greater emphasis to the motion compensated previous image 216 (or another source of image data) for pixels locations where the corrected dark current image 904 has a high light level. In one example, weight values of the weight map 910 are obtained by subtracting pixel values of the corrected dark current image 904 from a maximum light level value 912. For instance, for an 8-bit image where a value of 255 represents white, weight values of the weight map 910 may be obtained by w(DC)=255−DC, where w represents the weight of the weight map 910 and DC represents the pixel value from the corrected dark current image 904. In some instances, the weight map 910 may comprise an inverse image of the corrected dark current image 904.

Referring again to FIG. 2, the weight values of the weight map 910, w, may be used to generate an output image 220 by facilitating weighted filtering 218 (e.g., weighted averaging, or another weighted combination) of the dark current corrected image 208 and the motion compensated previous image 216. As noted above, pixel values of the output image 220 may be determined according to $(1-w)*I_{prev}+w*I_{cur}$. Although FIG. 2 focuses, in at least some respects, on an example in which the weight map is used to filter the dark current corrected image 208 with a motion compensated previous image 216, a weight map obtained via weight map generation 210 may be utilized to facilitate weighted filtering 218 of a dark current corrected image with any set of alternative pixel values (e.g., neighboring pixels may be utilized as a set of alternative pixel values).

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 10:
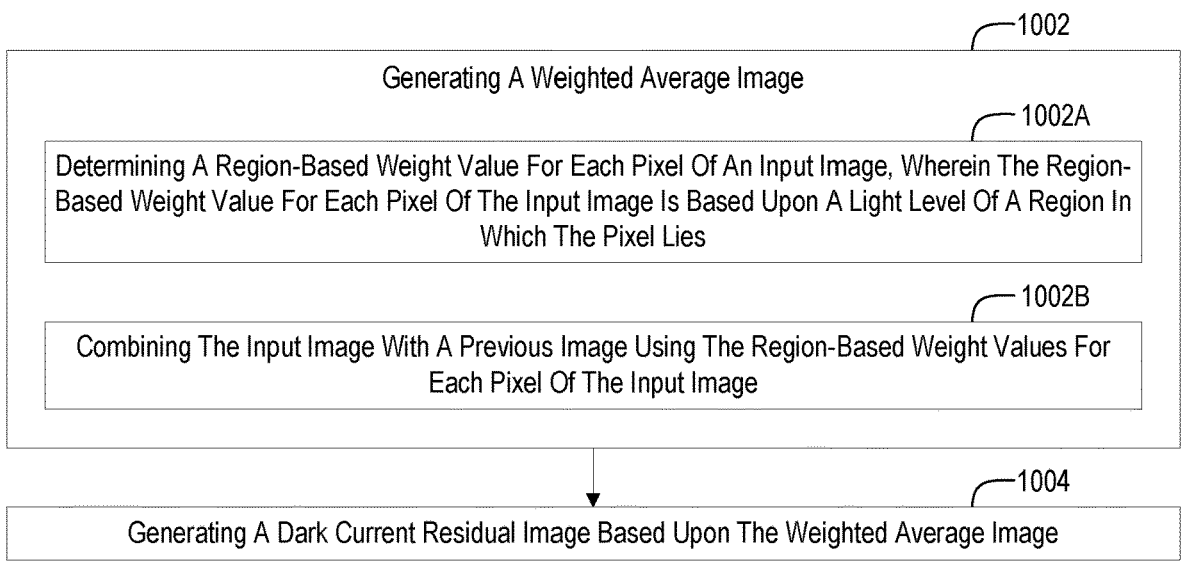
FIGS. 10-12 illustrate example flow diagrams depicting acts associated with generating dark current residual images.
Figure 11:
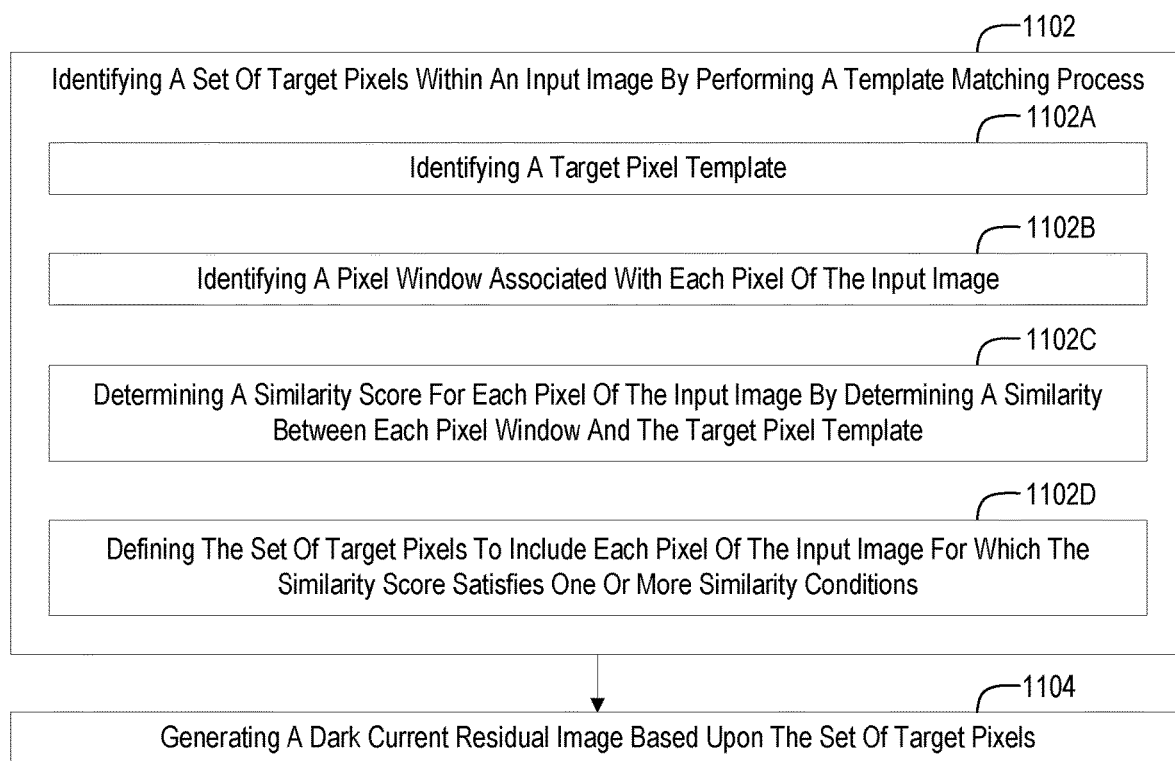
Figure 12:
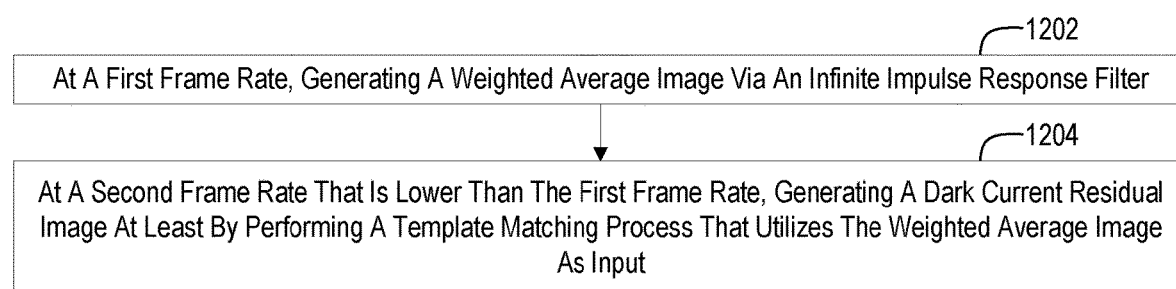
Figure 13:
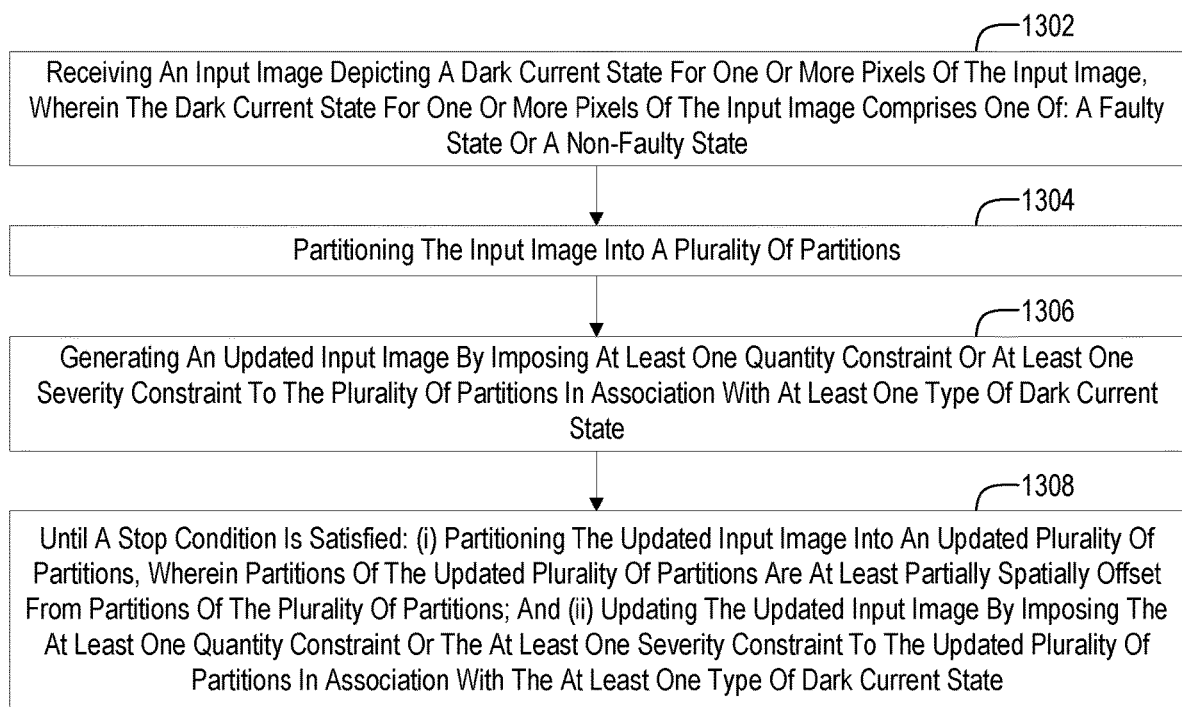
FIGS. 13-15 illustrate example flow diagrams depicting acts associated with modifying dark current images.
Figure 14:
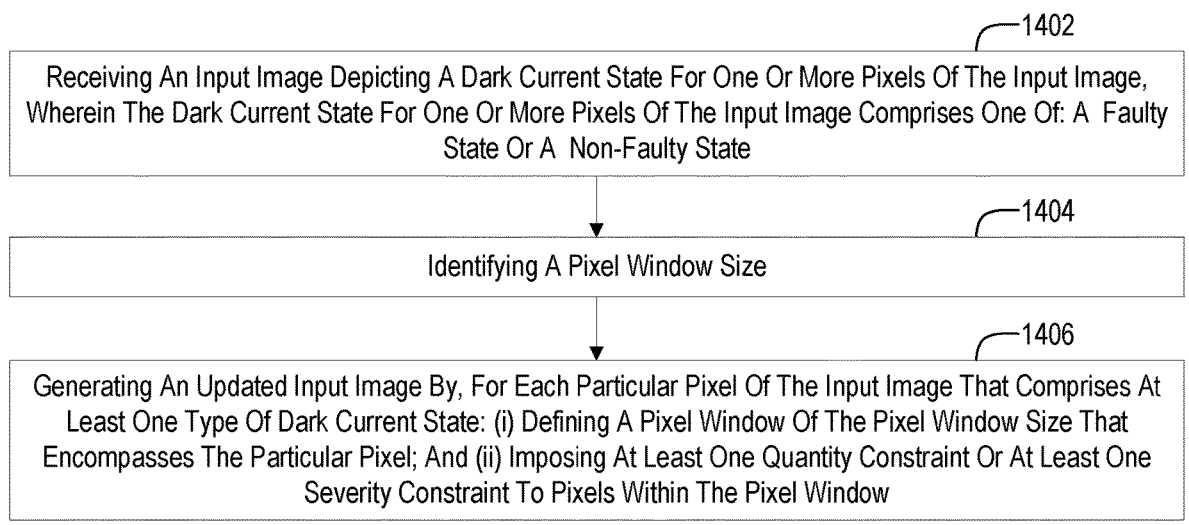
Figure 15:
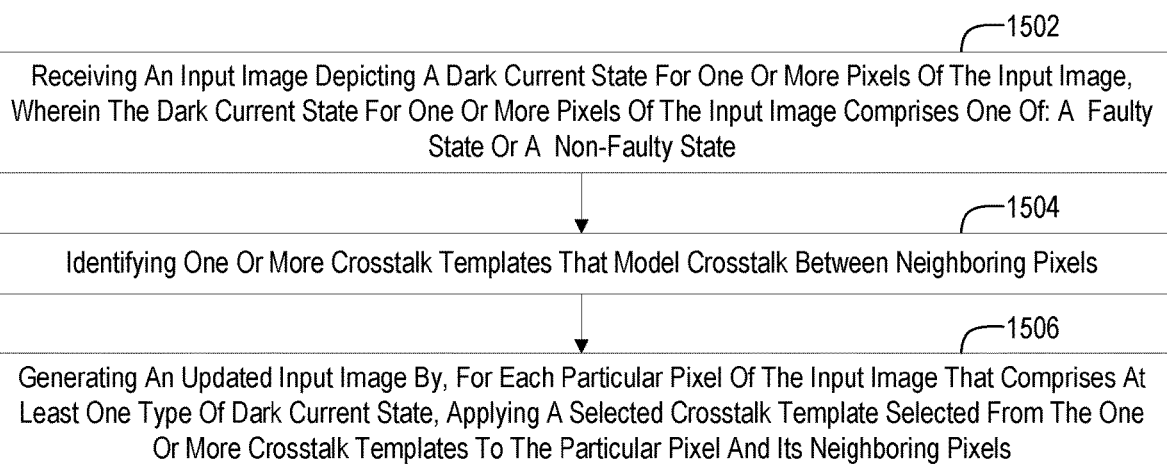
Figure 16:
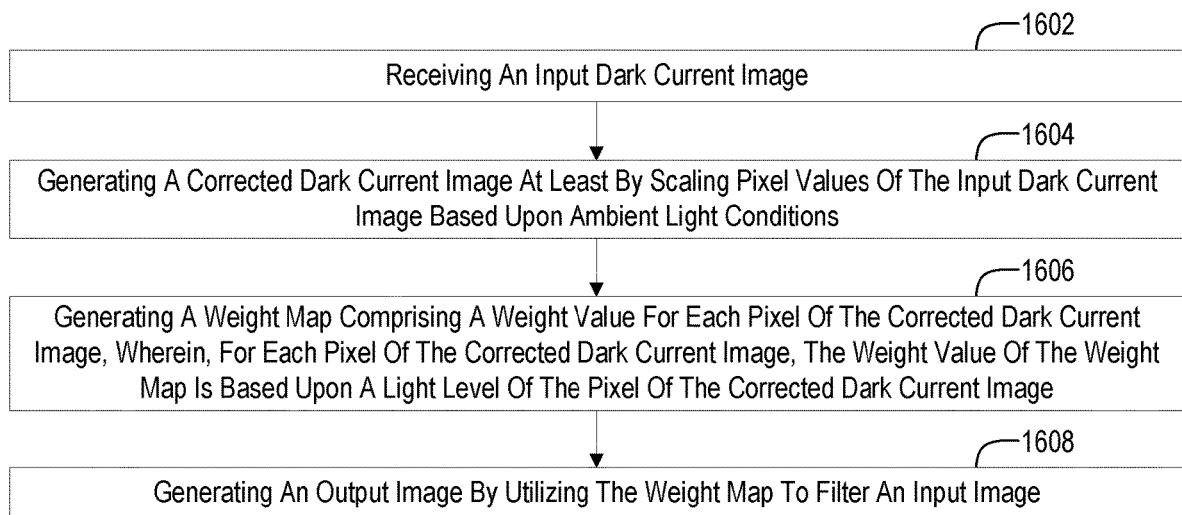
FIGS. 16 and 17 illustrate example flow diagrams depicting acts associated with facilitating dark current compensation by weighted filtering.
Figure 17:
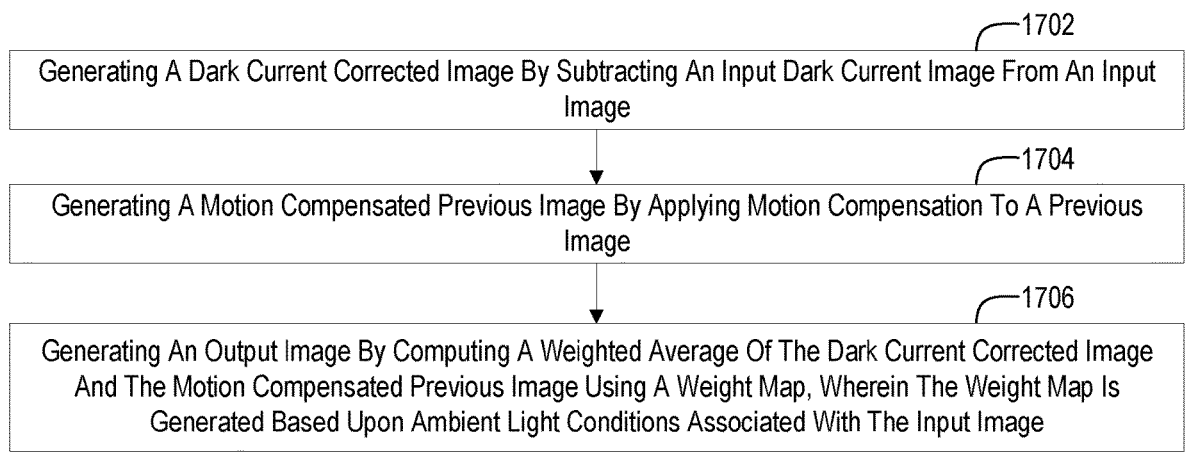

FIGS. 10, 11, and 12 illustrate example flow diagrams 1000, 1100, and 1200, respectively, depicting acts associated with generating dark current residual images. FIGS. 13, 14, and 15 illustrate example flow diagrams 1300, 1400, and 1500, respectively, depicting acts associated with modifying dark current images. FIGS. 16 and 17 illustrate example flow diagrams 1600 and 1700, respectively, depicting acts associated with facilitating dark current compensation by weighted filtering. The acts of flow diagrams 1000, 1100, 1200, 1300, 1400, 1500, 1600, 1700 may be performed utilizing one or more components of one or more systems (e.g., system 100).

Act 1002 of flow diagram 1000 of FIG. 10 includes generating a weighted average image. Act 1002 includes step 1002A, which comprises determining a region-based weight value for each pixel of an input image, wherein the region-based weight value for each pixel of the input image is based upon a light level of a region in which the pixel lies. In some instances, the input image comprises a dark current corrected image generated by subtracting an input dark current image from a captured image. In some implementations, determining region-based weight value for each pixel of the input image comprises applying one or more downscaling operations to the input image to obtain a downscaled input image. Each pixel of the downscaled input image may be used to determine the region-based weight value for a respective set of pixels of the input image. In some examples, the one or more downscaling operations comprise one or more mean-based downscaling operations or one or more median-based downscaling operations. In some instances, the one or more downscaling operations comprise a combination of one or more mean-based downscaling operations and one or more median-based downscaling operations.

In some implementations, determining the region-based weight value for each pixel of the input image further comprises: (i) converting the downscaled input image into gamma space to obtain a gamma corrected downscaled input image; and (ii) applying a weighting function to the gamma corrected downscaled input image to obtain a weighted gamma corrected downscaled input image. In some examples, the weighting function comprises a Gaussian function that assigns weight values that are inversely related to pixel light level. In some instances, determining the region-based weight value for each pixel of the input image further comprises upscaling the weighted gamma corrected downscaled input image to a resolution of the input image.

Act 1002 further comprises step 1002B, which includes combining the input image with a previous image using the region-based weight values for each pixel of the input image.

Act 1004 of flow diagram 1000 includes generating a dark current residual image based upon the weighted average image.

Act 1102 of flow diagram 1100 of FIG. 11 includes identifying a set of target pixels within an input image by performing a template matching process. Act 1102 comprises step 1102A, which includes identifying a target pixel template. Act 1102 comprises step 1102B, which includes identifying a pixel window associated with each pixel of the input image.

Act 1102 comprises step 1102C, which includes determining a similarity score for each pixel of the input image by determining a similarity between each pixel window and the target pixel template. In some implementations, determining a similarity score for each pixel of the input image by determining the similarity between each pixel window and the target pixel template comprises: (i) identifying a vector representation of the target pixel template; (ii) generating a respective vector representation of each pixel window; and (iii) comparing the vector representation of the target pixel template to the respective vector representation of each pixel window. In some examples, generating the respective vector representation of each pixel window comprises normalizing each pixel window for offset and gain. In some instances, normalizing each pixel window for offset comprises subtracting an average pixel value from each pixel of the pixel window. The average pixel value may be computed from non-center pixels of the pixel window. In some implementations, normalizing each pixel window for gain comprises converting each pixel window into a unit vector. In some examples, comparing the vector representation of the target pixel template to the respective vector representation of each pixel window comprises computing a dot product between the vector representation of the target pixel template and the respective vector representation of each pixel window. In some instances, the one or more similarity conditions comprise an upper threshold and a lower threshold. The set of target pixels may comprise: (i) a first subset of target pixels of the input image that satisfy the upper threshold; and (ii) a second subset of target pixels of the input image that satisfy the lower threshold. In some implementations, the dark current residual image depicts: (i) the first subset of target pixels of the input image with a first type of pixel value; and (ii) the second subset of target pixels of the input image with a second type of pixel value. In some examples, the first type of pixel value is associated with a first dark current state, and the second type of pixel value is associated with a second dark current state. In some instances, the first dark current state comprises a faulty state, and the second dark current state comprises a non-faulty state.

Act 1102 comprises step 1102D, which includes defining the set of target pixels to include each pixel of the input image for which the similarity score satisfies one or more similarity conditions.

Act 1104 includes generating a dark current residual image based upon the set of target pixels.

Act 1202 of flow diagram 1200 of FIG. 12 includes, at a first frame rate, generating a weighted average image via an infinite impulse response filter. In some implementations, the system is configured to refrain from performing motion compensation to align temporally consecutive weighted average images generated via the infinite impulse response filter.

Act 1204 of flow diagram 1200 includes, at a second frame rate that is lower than the first frame rate, generating a dark current residual image at least by performing a template matching process that utilizes the weighted average image as input.

Act 1302 of flow diagram 1300 of FIG. 13 includes receiving an input image depicting a dark current state for one or more pixels of the input image, wherein the dark current state for one or more pixels of the input image comprises one of: a faulty state or a non-faulty state. In some examples, the input image comprises a dark current state image.

Act 1304 of flow diagram 1300 includes partitioning the input image into a plurality of partitions.

Act 1306 of flow diagram 1300 includes generating an updated input image by imposing at least one quantity constraint or at least one severity constraint to the plurality of partitions in association with at least one type of dark current state. In some instances, the at least one type of dark current state comprises the faulty state. In some implementations, imposing the at least one quantity constraint or the at least one severity constraint to the plurality of partitions in association with the faulty state comprises, within each partition of the plurality of partitions, changing the dark current state for all pixels that comprise the faulty state within the partition to a different state except for the pixel within the partition associated with a highest magnitude. In some examples, imposing the at least one quantity constraint or the at least one severity constraint to the plurality of partitions in association with the faulty state comprises, within each partition of the plurality of partitions: (i) comparing the pixel within the partition associated with the highest magnitude to a magnitude threshold; and (ii) in response to determining that the pixel within the partition associated with the highest magnitude fails to satisfy the magnitude threshold, changing the dark current state for the pixel within the partition associated with the highest magnitude to a different state.

Act 1308 of flow diagram 1300 includes, until a stop condition is satisfied: (i) partitioning the updated input image into an updated plurality of partitions, wherein partitions of the updated plurality of partitions are at least partially spatially offset from partitions of the plurality of partitions; and (ii) updating the updated input image by imposing the at least one quantity constraint or the at least one severity constraint to the updated plurality of partitions in association with the at least one type of dark current state. In some instances, the stop condition comprises performance of a predetermined number of iterations. In some implementations, the stop condition comprises determining that the updated input image comprises a predetermined quantity of pixels that comprise the at least one type of dark current state.

Act 1402 of flow diagram 1400 of FIG. 14 includes receiving an input image depicting a dark current state for one or more pixels of the input image, wherein the dark current state for one or more pixels of the input image comprises one of: a faulty state or a non-faulty state. In some examples, the input image comprises a dark current state image.

Act 1404 of flow diagram 1400 includes identifying a pixel window size.

Act 1406 of flow diagram 1400 includes generating an updated input image by, for each particular pixel of the input image that comprises at least one type of dark current state: (i) defining a pixel window of the pixel window size that encompasses the particular pixel; and (ii) imposing at least one quantity constraint or at least one severity constraint to pixels within the pixel window. In some instances, the at least one type of dark current state comprises the faulty state. In some implementations, imposing the at least one quantity constraint or the at least one severity constraint to pixels within the pixel window comprises: (i) determining whether one or more other pixels of the pixel window comprise the faulty state and comprise a greater magnitude than the particular pixel; and (ii) in response to determining that one or more other pixels of the pixel window comprise the faulty state and comprise a greater magnitude than the particular pixel, changing the dark current state for the particular pixel to a different state.

Act 1502 of flow diagram 1500 of FIG. 15 includes receiving an input image depicting a dark current state for one or more pixels of the input image, wherein the dark current state for one or more pixels of the input image comprises one of: a faulty state or a non-faulty state. In some examples, the input image comprises a dark current state image.

Act 1504 of flow diagram 1500 includes identifying one or more crosstalk templates that model crosstalk between neighboring pixels. In some instances, the one or more crosstalk templates model crosstalk between a faulty pixel and its neighboring pixels. In some implementations, the one or more crosstalk templates are identified based upon whether the input image was acquired in a binned mode or an unbinned mode.

Act 1506 of flow diagram 1500 includes generating an updated input image by, for each particular pixel of the input image that comprises at least one type of dark current state, applying a selected crosstalk template selected from the one or more crosstalk templates to the particular pixel and its neighboring pixels. In some implementations, when the input image was acquired in the binned mode, the selected crosstalk template is selected from the one or more crosstalk templates for the particular pixel by: (i) identifying a respective vector representation of each of the one or more crosstalk templates; (ii) generating a respective vector representation of the particular pixel and its neighboring pixels; and (iii) selecting the selected crosstalk template based upon a comparison of the respective vector representation of each of the one or more crosstalk templates to the respective vector representation of the particular pixel and its neighboring pixels. In some examples, generating the respective vector representation of the particular pixel and its neighboring pixels comprises normalizing the particular pixel and its neighboring pixels for offset and gain. In some instances, normalizing the particular pixel and its neighboring pixels for offset comprises subtracting an average of the particular pixel and its neighboring pixels from the particular pixel and its neighboring pixels. In some examples, normalizing the particular pixel and its neighboring pixels for gain comprises converting the particular pixel and its neighboring pixels into a unit vector. In some instances, the comparison of the respective vector representation of each of the one or more crosstalk templates to the respective vector representation of the particular pixel and its neighboring pixels comprises a dot product computed between the respective vector representation of each of the one or more crosstalk templates and the respective vector representation of the particular pixel and its neighboring pixels. A highest dot product computed between the respective vector representation of each of the one or more crosstalk templates and the respective vector representation of the particular pixel and its neighboring pixels may indicate the selected crosstalk template. In some implementations, applying the selected crosstalk template to the particular pixel and its neighboring pixels comprises scaling and adding an offset to a normalized representation of the selected crosstalk template.

Act 1602 of flow diagram 1600 of FIG. 16 includes receiving an input dark current image. In some examples, the input dark current image is generated based upon a factory calibrated dark current image. In some instances, the input dark current image is generated based upon a modified factory calibrated dark current image. The modified factory calibrated dark current image may be interpolated or extrapolated from the factory calibrated dark current image based upon runtime image capture conditions and image capture conditions associated with the factory calibrated dark current image. In some implementations, the input dark current image is generated based upon a modified factory calibrated dark current image. In some examples, the input dark current image comprises a dynamic dark current image determined based at least in part on the modified factory calibrated dark current image. In some instances, the dynamic dark current image is generated by updating the modified factory calibrated dark current image with a dark current residual image.

Act 1604 of flow diagram 1600 includes generating a corrected dark current image at least by scaling pixel values of the input dark current image based upon ambient light conditions. In some implementations, generating the corrected dark current image comprises converting input dark current image into gamma corrected space. In some examples, generating the corrected dark current image comprises scaling pixel values of the input dark current image by a gain value. In some instances, the gain value is associated with the input image used to generate the output image.

Act 1606 of flow diagram 1600 includes generating a weight map comprising a weight value for each pixel of the corrected dark current image, wherein, for each pixel of the corrected dark current image, the weight value of the weight map is based upon a light level of the pixel of the corrected dark current image. In some implementations, the weight value of the weight map for each pixel of the corrected dark current image is based upon a difference between a maximum light level value and the pixel of the corrected dark current image. In some examples, the weight map comprises an inverse image of the corrected dark current image.

Act 1608 of flow diagram 1600 includes generating an output image by utilizing the weight map to filter an input image. In some instances, generating the output image comprises utilizing the weight map to generate a weighted combination of the input image and a set of alternative pixel values. In some implementations, the set of alternative pixel values comprises a motion compensated previous image. In some examples, the set of alternative pixel values comprises, for each pixel of the input image, one or more neighboring pixels of the input image.

Act 1702 of flow diagram 1700 of FIG. 17 includes generating a dark current corrected image by subtracting an input dark current image from an input image. In some instances, the input dark current image is generated based upon a factory calibrated dark current image. In some implementations, the input dark current image is generated based upon a modified factory calibrated dark current image. The modified factory calibrated dark current image may be interpolated or extrapolated from the factory calibrated dark current image based upon runtime image capture conditions and image capture conditions associated with the factory calibrated dark current image. In some examples, the input dark current image comprises a dynamic dark current image determined based at least in part on the modified factory calibrated dark current image. In some instances, the dynamic dark current image is generated by updating the modified factory calibrated dark current image with a dark current residual image.

Act 1704 of flow diagram 1700 includes generating a motion compensated previous image by applying motion compensation to a previous image.

Act 1706 of flow diagram 1700 includes generating an output image by computing a weighted average of the dark current corrected image and the motion compensated previous image using a weight map, wherein the weight map is generated based upon ambient light conditions associated with the input image. In some implementations, the weight map comprises an inverse image of a corrected dark current image generated at least by scaling pixel values of the input dark current image based upon ambient light conditions.

Additional Details Related to the Disclosed Embodiments

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

As used herein, the term "about", when used to modify a numerical value or range, refers to any value within 5%, 10%, 15%, 20%, or 25% of the numerical value modified by the term "about".

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

We claim:

1. A system for facilitating dark current compensation by weighted filtering, comprising:
one or more processors; and
one or more hardware storage devices that store instructions that are executable by the one or more processors to configure the system to:
access an input image, wherein the input image is captured under ambient light conditions;
receive an input dark current image;
generate a corrected dark current image at least by scaling pixel values of the input dark current image based upon the ambient light conditions under which the input image is captured;
generate a weight map comprising a weight value for each pixel of the corrected dark current image, wherein, for each pixel of the corrected dark current image, the weight value of the weight map is based upon a light level of the pixel of the corrected dark current image; and
generate an output image by utilizing the weight map to filter the input image.

2. The system of claim 1, wherein the input dark current image is generated based upon a factory calibrated dark current image.

3. The system of claim 2, wherein the input dark current image is generated based upon a modified factory calibrated dark current image, wherein the modified factory calibrated dark current image is interpolated or extrapolated from the factory calibrated dark current image based upon runtime image capture conditions and image capture conditions associated with the factory calibrated dark current image.

4. The system of claim 3, wherein the input dark current image comprises a dynamic dark current image determined based at least in part on the modified factory calibrated dark current image.

5. The system of claim 4, wherein the dynamic dark current image is generated by updating the modified factory calibrated dark current image with a dark current residual image.

6. The system of claim 1, wherein generating the corrected dark current image comprises converting input dark current image into gamma corrected space.

7. The system of claim 1, wherein generating the corrected dark current image comprises scaling pixel values of the input dark current image by a gain value.

8. The system of claim 7, wherein the gain value is associated with the input image used to generate the output image.

9. The system of claim 1, wherein the weight value of the weight map for each pixel of the corrected dark current image is based upon a difference between a maximum light level value and the pixel of the corrected dark current image.

10. The system of claim 1, wherein the weight map comprises an inverse image of the corrected dark current image.

11. The system of claim 1, wherein generating the output image comprises utilizing the weight map to generate a weighted combination of the input image and a set of alternative pixel values.

12. The system of claim 11, wherein the set of alternative pixel values comprises a motion compensated previous image.

13. The system of claim 11, wherein the set of alternative pixel values comprises, for each pixel of the input image, one or more neighboring pixels of the input image.

14. A system for facilitating dark current compensation by weighted filtering, comprising:
one or more processors; and
one or more hardware storage devices that store instructions that are executable by the one or more processors to configure the system to:
generate a dark current corrected image by subtracting an input dark current image from an input image;
generate a motion compensated previous image by applying motion compensation to a previous image; and
generate an output image by computing a weighted average of the dark current corrected image and the motion compensated previous image using a weight map, wherein the weight map is generated based upon ambient light conditions associated with the input image.

15. The system of claim 14, wherein the input dark current image is generated based upon a factory calibrated dark current image.

16. The system of claim 15, wherein the input dark current image is generated based upon a modified factory calibrated dark current image, wherein the modified factory calibrated dark current image is interpolated or extrapolated from the factory calibrated dark current image based upon runtime image capture conditions and image capture conditions associated with the factory calibrated dark current image.

17. The system of claim 16, wherein the input dark current image comprises a dynamic dark current image determined based at least in part on the modified factory calibrated dark current image.

18. The system of claim 17, wherein the dynamic dark current image is generated by updating the modified factory calibrated dark current image with a dark current residual image.

19. The system of claim 14, wherein the weight map comprises an inverse image of a corrected dark current image generated at least by scaling pixel values of the input dark current image based upon ambient light conditions.

20. A method for facilitating dark current compensation by weighted filtering, comprising:
  accessing an input image, wherein the input image is captured under ambient light conditions;
  receiving an input dark current image;
  generating a corrected dark current image at least by scaling pixel values of the input dark current image based upon the ambient light conditions under which the input image is captured;
  generating a weight map comprising a weight value for each pixel of the corrected dark current image, wherein, for each pixel of the corrected dark current image, the weight value of the weight map is based upon a light level of the pixel of the corrected dark current image; and
  generating an output image by utilizing the weight map to filter the input image.

* * * * *